United States Patent
Fujiwara et al.

(10) Patent No.: US 11,623,424 B2
(45) Date of Patent: Apr. 11, 2023

(54) RESIN SHEET HAVING CAPILLACEOUS BODIES AND MOLDED PRODUCT THEREOF

(71) Applicant: DENKA COMPANY LIMITED, Tokyo (JP)

(72) Inventors: Junpei Fujiwara, Isesaki (JP); Shogo Hoshino, Isesaki (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 16/641,973

(22) PCT Filed: Sep. 5, 2018

(86) PCT No.: PCT/JP2018/032897
§ 371 (c)(1),
(2) Date: Feb. 25, 2020

(87) PCT Pub. No.: WO2019/049897
PCT Pub. Date: Mar. 14, 2019

(65) Prior Publication Data
US 2020/0215787 A1   Jul. 9, 2020

(30) Foreign Application Priority Data

Sep. 6, 2017  (JP) .............................. JP2017-170896

(51) Int. Cl.
*B32B 3/30* (2006.01)
*B29C 59/04* (2006.01)
(Continued)

(52) U.S. Cl.
CPC ................ *B32B 3/30* (2013.01); *B29C 59/04* (2013.01); *B32B 7/12* (2013.01); *B32B 27/08* (2013.01);
(Continued)

(58) Field of Classification Search
CPC ............ B32B 3/30; B32B 27/08; D04H 11/08
See application file for complete search history.

(56) References Cited

U.S. PATENT DOCUMENTS 3,027,595 A * 4/1962 Ishiyama .............. B29C 33/044
425/363
3,141,051 A * 7/1964 Takai ........................ B44F 9/12
72/46

(Continued)

FOREIGN PATENT DOCUMENTS

CA         2324313 A1    9/1999
CN         1723102 A     1/2006
(Continued)

OTHER PUBLICATIONS

Aug. 27, 2020 Extended European Search Report issued in European Patent Application No. 18 85 4649.3.
(Continued)

*Primary Examiner* — Michael Zhang
(74) *Attorney, Agent, or Firm* — Oliff PLC

(57) ABSTRACT

A sheet expressing a good tactile sensation and a molded product thereof. By configuring a resin sheet including hairlike bodies arranged regularly on at least one surface of an underlayer in which a continuous phase is formed without any structural boundary between the underlayer and the hairlike bodies, and the underlayer and the hairlike bodies have at least partially a crosslinked structure, a molded product expressing a good tactile sensation is obtained.

17 Claims, 7 Drawing Sheets

(51) Int. Cl.
  *B32B 27/30* (2006.01)
  *B32B 27/34* (2006.01)
  *B32B 27/36* (2006.01)
  *B32B 27/08* (2006.01)
  *B32B 27/32* (2006.01)
  *B32B 7/12* (2006.01)

(52) U.S. Cl.
  CPC .......... *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 2250/02* (2013.01); *B32B 2250/24* (2013.01); *B32B 2307/416* (2013.01); *B32B 2307/732* (2013.01); *B32B 2307/748* (2013.01)

(56) References Cited

U.S. PATENT DOCUMENTS

| | | | |
|---|---|---|---|
| 3,312,583 A * | 4/1967 | Rochlis | A46D 3/005 15/207.2 |
| 3,390,403 A | 6/1968 | Van Tilburg | |
| 3,557,407 A | 1/1971 | Lemelson | |
| 3,987,228 A | 10/1976 | Hemming | |
| 4,107,259 A | 8/1978 | Liu et al. | |
| 4,118,530 A * | 10/1978 | Benedyk | B29C 45/02 428/92 |
| 6,511,734 B1 | 1/2003 | Wagner | |
| 2004/0005434 A1* | 1/2004 | Calhoun | D04H 11/08 428/91 |
| 2004/0118811 A1 | 6/2004 | Stone et al. | |
| 2004/0119208 A1 | 6/2004 | Gray et al. | |
| 2004/0121120 A1 | 6/2004 | Gray et al. | |
| 2004/0180298 A1 | 9/2004 | Stone et al. | |
| 2005/0191496 A1 | 9/2005 | Gray et al. | |
| 2006/0234049 A1* | 10/2006 | Van Dun | D01F 8/06 428/364 |
| 2008/0044777 A1 | 2/2008 | Gary et al. | |
| 2008/0280085 A1* | 11/2008 | Livne | C09J 7/20 428/40.1 |
| 2009/0033000 A1 | 2/2009 | Kurtz, Jr. | |
| 2010/0019415 A1 | 1/2010 | Stone et al. | |
| 2011/0117321 A1* | 5/2011 | Menon | B29C 33/3878 428/156 |
| 2012/0052234 A1* | 3/2012 | Natarajan | B29C 33/52 428/99 |
| 2014/0103563 A1 | 4/2014 | Gray et al. | |
| 2014/0329061 A1* | 11/2014 | Lu | B05D 5/08 428/201 |
| 2015/0306852 A1 | 10/2015 | Fujiwara et al. | |
| 2015/0314554 A1* | 11/2015 | Fujiwara | B32B 27/302 428/35.7 |

FOREIGN PATENT DOCUMENTS

| | | |
|---|---|---|
| JP | S50-124965 A | 10/1975 |
| JP | S56-020669 A | 2/1981 |
| JP | H08-142103 A | 6/1996 |
| JP | H09-057934 A | 3/1997 |
| JP | H09-155972 A | 6/1997 |
| JP | 2002-506753 A | 3/2002 |
| JP | 2002-526669 A | 8/2002 |
| JP | 2007-290158 A | 11/2007 |
| JP | 2008-238602 A | 10/2008 |
| JP | 2010-280203 A | 12/2010 |
| JP | 2011-098739 A | 5/2011 |
| JP | 2011-152795 A | 8/2011 |
| WO | 2015/159825 A1 | 10/2015 |
| WO | 2016/047548 A1 | 3/2016 |

OTHER PUBLICATIONS

Oct. 23, 2018 International Search Report issued in International Patent Application No. PCT/JP2018/032897.

* cited by examiner

RESIN SHEET HAVING CAPILLACEOUS BODIES AND MOLDED PRODUCT THEREOF

TECHNICAL FIELD

The present invention pertains to a resin sheet having hairlike bodies and a molded product thereof.

BACKGROUND ART

Conventionally, sheets of paper and polymer materials are used as interior materials of automobiles and the housings of associated components, housings of electronic devices and appliances, building materials such as wallpaper, housings for toys and game consoles, and members of daily necessities. Further, as a method to provide a good tactile sensation to a surface of a sheet, Patent Document 1, for example, presents a decorative sheet wherein a thermoplastic polyesteric resin is extrusion laminated on a decorative paper.

Patent Document 2 presents a decorative sheet containing resin beads. Patent Document 3 presents a decorative resin sheet in which a polylactic acid resin is coated with a urethanic resin and a surface thereof is heat-embossed.

Furthermore, Patent Document 4 presents a decorative sheet in which, in order for a relief shape on the sheet surface not to be impaired, a protective layer consisting of anti-abrasive particles and a urethanic resin is formed on a surface of an embossed ABS resin sheet. Patent Document 5 presents a container having a plurality of stripes in a fixed direction and provided with a napped decorative surface formed by raising a nap from the stripes.

However, the provision of a resin sheet expressing a better tactile sensation is desired.

[Patent Document 1] JP H9-057934 A
[Patent Document 2] JP 2008-238602 A
[Patent Document 3] JP 2011-152795 A
[Patent Document 4] JP 2010-280203 A
[Patent Document 5] JP 2011-098739 A

SUMMARY OF INVENTION

Technical Problem

The object of the present invention is to provide a sheet expressing a good tactile sensation and a molded product thereof.

Solution to Problem

That is, as a result of investigation of various tactile sensation-expressing means, the present inventors believed that it would be good to provide a capillaceous or hairlike shape to a sheet surface to express a good tactile sensation and has discovered that a good tactile sensation is expressed by forming capillaceous or hairlike bodies arranged regularly on the surface. Furthermore, the present inventors have discovered that a molded product maintaining capillaceous or hairlike bodies and retaining a good tactile sensation is obtained by crosslinking with electron beam irradiation even after heat-stretch molding, arriving at completion of the present invention.

In the description below, the term "hairlike" is intended to mean hairlike or capillaceous.

The present invention, which solves the above problem, is configured as follows.

(1) A resin sheet having hairlike bodies arranged regularly on at least one surface of an underlayer, wherein a continuous phase is formed without any structural boundary between the underlayer and the hairlike bodies, and the underlayer and the hairlike bodies at least partially have a crosslinked structure.

(2) The resin sheet described in (1), wherein the underlayer and the hairlike bodies include a thermoplastic resin as a main component and the thermoplastic resin contains at least one selected from a styrenic resin, an olefinic resin, a polyvinyl chloride resin, a thermoplastic elastomer, and a fluorine-based resin.

(3) The resin sheet described in (1) or (2), wherein the average height of the hairlike bodies is no less than 100 μm and no greater than 1,200 the average diameter of the hairlike bodies is no less than 1 μm and no greater than 50 μm, and the average spacing between the hairlike bodies is no less than 20 μm and no greater than 200 μm.

(4) The resin sheet described in any one of (1) to (3), wherein the ratio of the static friction coefficient of the surface having the hairlike bodies with respect to the dynamic friction coefficient thereof is 1.0-10.0.

(5) The resin sheet described in any one of (1) to (4), wherein the angular width at which the reflected light intensity of the surface having the hairlike bodies is obtained ranges from −90° to 90°.

(6) The resin sheet described in any one of (1) to (5), wherein the thickness of the underlayer is no less than 15 μm.

(7) The resin sheet described in any one of (1) to (6), wherein the hairlike bodies extend hairlike in a direction away from the underlayer and a swelling is formed at the tips thereof.

(8) The resin sheet described in any one of (1) to (7), wherein the underlayer and the hairlike bodies are formed from a single sheet.

(9) The resin sheet described in any one of (1) to (8), wherein the resin sheet is a multilayer resin sheet.

(10) The resin sheet described in any one of (1) to (9), wherein at least one substrate layer selected from a styrenic resin, an olefinic resin, a polyesteric resin, a nylon-based resin, an acrylic resin, and a thermoplastic elastomer is laminated on the other surface of the underlayer.

(11) The resin sheet described in any one of (1) to (10), comprising one or more additives selected from a water and oil repellent, an antistatic agent, an antibacterial agent, an ultraviolet absorbing agent, a colorant, and a mold release agent.

(12) The resin sheet described in any one of (1) to (11), wherein the reduction rate of the average height of the hairlike bodies due to heat-stretch molding is less than 30%.

(13) A manufacturing method for the resin sheet described in any one of (1) to (12), characterized in that the hairlike bodies are formed by casting, with a transfer roll on which a relief process has been performed and a touch roll, a sheet that has been melt-extruded from a die with a melt extrusion technique.

(14) A molded product of the resin sheet described in any one of (1) to (12).

(15) The molded product described in (14), which is an automobile interior member, an electronic device member, an electronic device cladding, a cosmetic container member, a stationery member, or a livingware member.

(16) An article using the resin sheet described in any one of (1) to (12).

(17) The article described in (16), which is an automobile interior member, an electronic device member, an electronic device cladding, a cosmetic container member, a stationery member, or a livingware member.

(18) A method for manufacturing the molded product or article described in any one of (14) to (17), comprising vacuum-pressure molding, insert molding, or in-mold molding the resin sheet described in any one of (1) to (12).

Advantageous Effects of Invention

According to the present invention, a sheet expressing a good tactile sensation and a molded product thereof can be provided.

DESCRIPTION OF EMBODIMENTS

Below, various embodiments of the resin sheet shall be explained, followed by an explanation of the method for manufacturing the resin sheet, but in cases in which the specific explanation of one embodiment disclosed herein applies to another embodiment, the explanation thereof for the other embodiment shall be omitted.

First Embodiment

A resin sheet according to the first embodiment of the present invention is a resin sheet having an underlayer and hairlike bodies arranged regularly on at least one surface of the underlayer in which a continuous phase is formed without any structural boundary between the underlayer and the hairlike bodies and the underlayer and the hairlike bodies at least partially have a crosslinked structure, the resin sheet being manufactured from a thermoplastic resin.

<Underlayer>

Figure 1:
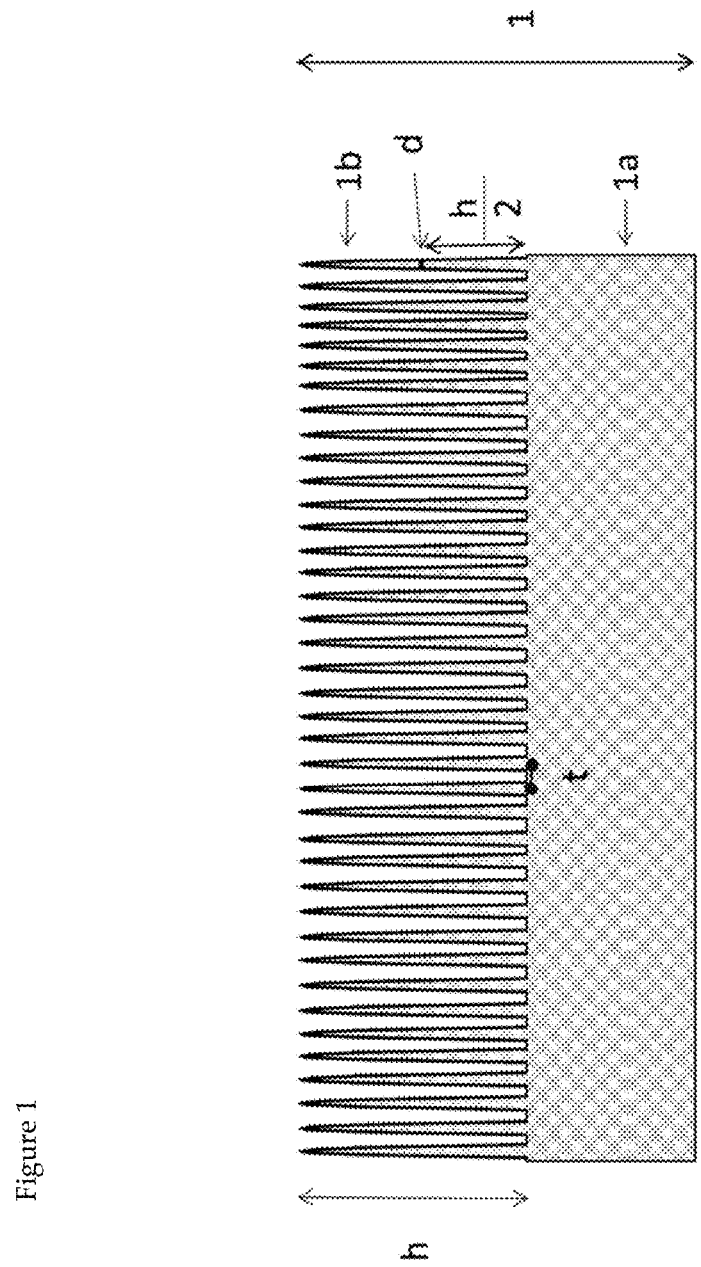
FIG. 1 is a simplified vertical side cross-sectional view showing a resin sheet according to the first embodiment of the present invention.

The underlayer (1a) is the portion of the surface other than the hairlike bodies 1b, as shown in FIG. 1. The thickness of the underlayer is the thickness from the roots of the hairlike bodies to the surface on the opposite side of the underlayer. It is preferable that the average thickness of the underlayer is 15-1,000 μm and more preferably, 150-800 μm. By setting the thickness to no less than 15 μm, the height of the hairlike bodies can be sufficiently expressed. Further, by setting the thickness to no greater than 1,000 μm, the hairlike bodies can be formed efficiently. A continuous phase is formed without a structural boundary between the underlayer and the hairlike bodies. The absence of a structural boundary means that the underlayer and hairlike bodies are integrally formed and that there is no structurally clear border section therebetween. Further, forming a continuous phase is a state in which there are no seams between the underlayer and the hairlike bodies and no discontinuities (is a continuous phase). On this point, the present invention differs from a structure in which hairlike bodies are transplanted to an underlayer. The underlayer and hairlike bodies have the same composition and the bonds between the underlayer and the hairlike bodies may include covalent bonds. Covalent bonds are chemical bonds formed by an electron pair being shared by two atoms, but in thermoplastic resins which are chain molecules in which the monomers are connected, each polymer is bonded by covalent bonds and is bonded more strongly than by the van der Waals bonds or hydrogen bonds acting between the polymer molecules.

Further, the underlayer and the hairlike bodies may be derived not from separate, but from the same solid thermoplastic resin sheet. Derived from the same solid thermoplastic resin sheet means, for example, the hairlike bodies and the underlayer being obtained, directly or indirectly, based on the same solid resin sheet.

Further, the underlayer and the hairlike bodies may be formed from the same solid thermoplastic resin sheet. Formed from the same solid thermoplastic resin sheet means that the hairlike bodies and the underlayer are directly formed by working a single resin sheet.

By forming a continuous phase without a structural boundary between the underlayer and the hairlike bodies, the hairlike bodies separating from the underlayer due to an external stimulus is suppressed and the sheet becomes one with a good tactile sensation. Further, manufacturing with fewer steps than when transplanting hairlike bodies can be carried out.

The underlayer and the hairlike bodies are made of the same resin composition containing a thermoplastic resin as a main component. Containing a thermoplastic resin as a main component means containing 50 mass % or more, 60 mass % or more, 70 mass % or more, 80 mass % or more, or 90 mass % or more of a thermoplastic resin. A resin comprising at least one of a styrenic resin, an olefinic resin, a polyvinyl chloride resin, a thermoplastic elastomer, and a fluorine-based resin can be used as the thermoplastic resin.

Styrenic monomers such as styrene, α-methylstyrene, p-methylstyrene, dimethylstyrene, p-t-butylstyrene, or chlorostyrene alone or copolymers thereof, copolymers of such a styrenic monomer and another monomer, for example, a styrene-ethylene copolymer (SE resin), a styrene-acrylonitrile copolymer (AS resin), or of the styrenic monomer and yet another polymer, for example, a grafted polymer graft polymerized in the presence of a diene-based rubber-like polymer such as polybutadiene, a styrene-butadiene copolymer, polyisoprene, or polychloroprene, for example, a polystyrene such as high-impact polystyrene (HIPS resin) or a styrene-acrylonitrile graft polymer (ABS resin) can be used as the styrenic resin. Further, a styrenic thermoplastic elastomer can also be used.

Polyolefinic resin means a resin made of a polymer comprising α-olefin as a monomer and includes polyethylenic resins and polypropylenic resins. A high-density polyethylene, a low-density polyethylene, a straight chain low-density polyethylene, a straight chain medium-density polyethylene or the like can be used as the polyethylene (PE) resin, and not only these materials alone, but also an ethylene-vinyl acetate copolymer, an ethylene-acrylic acid copolymer, an ethylene-acrylic ester copolymer, an ethylene-methacrylic ester copolymer, an ethylene-vinyl acetate-vinyl chloride copolymer, or the like may be used. In consideration of crosslinkability by electron beam irradiation, it is desirable to use a straight chain low-density polyethylene or a straight chain medium-density polyethylene.

Further, a homopolypropylene, a random polypropylene, a block polypropylene, etc. can be used as the polypropylene (PP) resin. When using a homopolypropylene, the structure of the homopolypropylene may be any of isotactic, atactic, and syndiotactic. When using a random polypropylene, a substance preferably having 2-20 carbon atoms and more preferably having 4-12 carbon atoms, for example, ethylene, 1-butene, 1-pentene, 1-hexene, 1-heptene, 1-octene, 1-nonene, or 1-decene can be used as the α-olefin to be copolymerized with propylene. When using a block polypropylene, a block copolymer (block polypropylene), a block copolymer comprising a rubber component, a graft copolymer, etc. can be used. In addition to using these olefin resins alone, they may be used in combination with other olefinic resins. In consideration of crosslinkability by electron beam irradiation, it is desirable to use a random polypropylene or a block polypropylene.

A vinyl chloride homopolymer or a copolymer of vinyl chloride and another comonomer can be used as the polyvinyl chloride. When the polyvinyl chloride is a copolymer, the polyvinyl chloride may be a random copolymer or may be a graft copolymer. A substance in which, for example, an ethylene-vinyl acetate copolymer or a thermoplastic urethane polymer is made the trunk polymer and vinyl chloride is graft polymerized thereto can be raised as one example of a graft copolymer. The polyvinyl chloride of the present embodiment is a composition demonstrating an extrusion-moldable soft polyvinyl chloride and containing an additive such as a polymer plasticizer. A known polymer plasticizer can be used as the polymer plasticizer, but, for example, an ethylene copolymer polymer plasticizer such as an ethylene-vinyl acetate-carbon monoxide copolymer, an ethylene-(meth)acrylic ester-carbon monoxide copolymer, or an ethylene-vinyl acetate copolymer with a high vinyl acetate content can be raised as a preferred example.

Substances having a structure in which a soft polymer substance and a hard polymer substance are combined are included as the thermoplastic elastomer. Specifically, there are styrenic elastomers, olefinic elastomers, vinyl chloride-based elastomers, polyesteric elastomers, polyamide-based elastomers, polyurethanic elastomers, etc. Regarding polyurethanic elastomers, either polyether-based or polyester-based elastomers may be selected. These elastomers can be selected and used from among those generally commercially available.

A vinylidene fluoride homopolymer and a vinylidene fluoride copolymer having vinylidene fluoride as the main component can be used as the fluorine resin. Polyvinylidene fluoride (PVDF) resins are crystalline resins exhibiting various crystal structures such as α-type, β-type, γ-type, and αp-type, but as the vinylidene fluoride copolymer, there are, for example, vinylidene fluoride-hexafluoropropylene copolymers, vinylidene fluoride-tetrafluoroethylene copolymers, vinylidene fluoride-chlorotrifluoroethylene copolymers, vinylidene fluoride-trifluoroethylene copolymers, vinylidene fluoride-tetrafluoroethlyene-hexafluoropropylene three-component copolymers, vinylidene fluoride-chlorotrifluoroethylene-hexafluoropropylene three-component copolymers, and mixtures of two or more thereof.

It is preferable that the melt mass flow rate of the thermoplastic resin at 190-300° C. is no less than 1 g/10 minutes. By setting the melt mass flow rate to no less than 1 g/10 minutes, the transferability of the shape of the hairlike bodies can be improved. The melt mass flow rate conforms to JIS K 7210 and is a value measured under any condition of each load (2.16-10.0 kg) at any temperature in a test temperature range from 190-300° C.

The composition of the thermoplastic resin may be alloyed with the abovementioned respective thermoplastic resins at any ratio in a range that does not inhibit the effects of the present invention, particularly in a range that does not inhibit the formation of the hairlike bodies. For example, when polyethylene and a styrenic thermoplastic elastomer are alloyed, it is preferable that the thermoplastic resin comprises 50 mass % or more of polyethylene with respect to 100 mass % of the resin composition. Furthermore, the thermoplastic resin may contain other additives. Additives such as a water repellent, an oil repellent, a colorant such as pigment or dye, a lubricant/mold release agent such as silicon oil or alkyl ester-based material, a fibrous reinforcement agent such as glass fibers, granular fine particles such as talc, clay, or silica or scaly fine particles such as mica as a filler, a low-molecular type antistatic agent such as a salt compound of sulfonic acid and an alkali metal or the like or a high-molecular type antistatic agent such as polyether ester amide, an ultraviolet absorbing agent, a flame retardant, an antibacterial agent, an antiviral agent, and a thermal stabilizer may be added as other additives in a range that does not inhibit the effects of the present invention. Furthermore, scrap resin generated in the resin sheet manufacturing process can be mixed and used.

As the water repellent/oil repellent, there are silicon-based water repellents, carnauba wax, and fluorine-based water/oil repellents. Organopolysiloxane, dimethylpolysiloxane, methylphenylpolysiloxane, methylhydrogenpolysiloxane, etc. are examples of the silicon and among these, dimethylpolysiloxane is suitably used. As commercial products, there are "Clinbell CB50-PP", "Clinbell CB-30PE", "Clinbell CB-1", "Clinbell CB-50AB" (manufactured by Fuji Chemical Industries, Ltd.), etc. in which, for example, silicon is alloyed with a resin. As the carnauba wax, there are "Carnauba No. 1" (manufactured by NIKKO RICA CORPORATION), etc., as commercially available products, and as the fluorine-based oil and water repellent, there are surfactants having a perfluoroalkyl group and, as commercially available products, "Surflon KT-PA" (manufactured by AGC SEIMI CHEMICAL CO., LTD.), etc., as a commercial product. The amount of the water and oil repellent added is preferably 0.5 mass % to 25 mass %, more preferably 1.0 mass % to 20 mass %, and still more preferably 1.5 mass % to 15 mass %. By setting the amount to no less than 0.5 mass %, a water and oil repellency effect can be obtained, and by setting the amount to no more than 25 mass %, worsening of moldability can be suppressed.

As the antistatic agent, there are polyetheresteramide-based polymer-type antistatic agents, ionomer-based polymer-type antistatic agents, etc. As commercially available polyetheresteramide-based polymer-type antistatic agents, there are "Pelestat 230", "Pelestat 6500", "Pelectron AS", "Pelectron HS" (manufactured by Sanyo Chemical Industries, Ltd.), etc. As commercially available ionomer-based polymer-type antistatic agents, there are "Entira SD100", "Entira MK400" (manufactured by DU PONT-MITSUI POLYCHEMICALS), etc. The amount of the antistatic agent added is preferably 5 mass % to 30 mass %, more preferably 7.5 mass % to 25 mass %, and still more preferably 10 mass % to 20 mass %. By setting the amount to no less than 5 mass %, antistatic performance can be obtained and by setting the amount to no more than 30 mass %, increases in production costs can be suppressed.

Among inorganic and organic antibacterial agents, either may be added. Considering dispersibility, inorganic agents are preferable. Specifically, there are metal ion (Ag, Zn, Cu) inorganic antibacterial agents, calcined shell calcium-based antibacterial agents, etc. As commercially available metal ion inorganic antibacterial agents, there are "Bactekiller BM102VT" (manufactured by Fuji Chemical Industries, Ltd.), "Novaron VZF200", "Novaron (AG300)" (manufactured by TOAGOSEI CO., LTD.), "KM-10D-G", "IM-10D-L" (manufactured by Sinanen Zeomic Co., Ltd.), etc. As calcined shell calcium-based antibacterial agents, there are "Scallow" (manufactured by FID, Ltd.), etc. The amount of the antibacterial agent added is preferably 0.5 mass % to 5 mass %, more preferably 0.6 mass % to 4 mass %, and still more preferably 0.7 mass % to 3 mass %. By setting the amount to no less than 0.5 mass %, antibacterial performance can be obtained and by setting the amount to no more than 5 mass %, increases in production costs can be suppressed.

An inorganic or organic ultraviolet absorbing agent can be used as the ultraviolet absorbing agent.

As the inorganic ultraviolet absorbing agent, for example, titanium oxide, zinc oxide, cesium oxide, iron oxide and many other types may be used. Among these, zinc oxide is particularly preferable because the transparency and ultraviolet impermeability thereof are excellent. As commercially available products, for example, a triazine-based ultraviolet absorbing agent "TINUVIN 1600" (manufactured by BASF SE) or the like may be used.

When an inorganic ultraviolet absorbing agent is used, the amount thereof added is preferably 1-5 parts by mass, more preferably 1.5-4.5 parts by mass, and still more preferably 2-4 parts by mass with respect to 100 parts by mass of the resin composition in total. By setting the amount added to no less than 1 part by mass, the effect of suppressing the deterioration of the sheet caused by ultraviolet rays can be prevented from lowering and by setting the amount added to no more than 5 parts by mass, increases in production costs can be suppressed.

A masterbatch or the like in which an inorganic ultraviolet absorbing agent is alloyed with a thermoplastic resin in advance can be used. For example, "Weather Resistance Master UNS (Polyester)" (manufactured by FIC Inc.), and "Weather Resistance Master UNE (Polyether)" (manufactured by FIC Inc.) are cited as commercially available masterbatch products based on a urethanic thermoplastic elastomer and, in consideration of production efficiency, it is preferable to use the masterbatch. The amount of the masterbatch added is preferably 1-5 parts by mass, more preferably 1.5-4.5 parts by mass, and still more preferably 2-4 parts by mass with respect to 100 parts by mass of the resin composition.

For example, triazine-based, benzotriazole-based, oxalic acid-based, benzophenone-based, hindered amine-based, and many other kinds of agents can be used as the organic ultraviolet absorbing agent. Preferably, in order to minimize volatilization during manufacturing and use of films, a high molecular weight-type ultraviolet absorbing agent having a molecular weight no less than 300 is suitably used.

When the organic ultraviolet absorbing agent is used, the amount added is preferably no less than 4 parts by mass, more preferably no less than 4.5 parts or more by mass, and still more preferably no less than 5 parts or more by mass with respect to a total of 100 parts by mass of the resin composition. By setting the content to no less than 4 parts by mass, the effect of suppressing deterioration of a sheet caused by ultraviolet rays can be obtained. Meanwhile, even if the content exceeds 8 parts by mass, the effect of suppressing the deterioration of the sheet caused by ultraviolet rays not only peaks, but also is not preferable in terms of cost.

As the lubricant/mold release agent, an aliphatic hydrocarbon-based compound, a higher fatty acid-based compound, a higher fatty alcohol-based compound, an alkylic mold release agent such as a fatty acid amalide-based compound, a silicon-based mold release agent, a fluorine-based mold release agent, etc. can be used. When the mold release agent is used, the amount added is preferably 1-5 parts by mass, more preferably 1.5-4.5 parts by mass, and still more preferably 2-4 parts by mass with respect to a total 100 parts by mass of the resin composition. By setting the amount added to no less than 1 part by mass, it is possible to suppress lowering of the release effect and by setting the amount added to no more than 5 parts by mass, bleed-out onto the sheet surface can be suppressed.

Further, a masterbatch or the like in which a lubricant/mold release agent is alloyed with a thermoplastic resin in advance can be used. For example, "Elastollan Master V" (manufactured by FCI Inc.) is cited as a commercially available masterbatch product based on a urethanic thermoplastic elastomer. In consideration of the production efficiency, it is preferable to use the masterbatch. The amount of the masterbatch added is preferably 1-5 parts by mass, more preferably 1.5-4.5 parts by mass, and still more preferably 2-4 parts by mass with respect to 100 parts by mass of the resin composition.

<Hairlike Bodies>

The hairlike bodies ($1b$) are a portion extending hairlike from the surface of the underlayer ($1a$), as shown in FIG. 1. The hairlike bodies are arranged regularly on the surface of the underlayer. Here, being arranged regularly means a state in which the hairlike bodies are not arranged randomly, that is, a state in which the hairlike bodies are arranged in an orderly fashion in one direction or in two directions. Whether or not the arrangement of the hairlike bodies is regular is determined based on the state of arrangement of the roots of the hairlike bodies. In an embodiment, the hairlike bodies are positioned on the underlayer at a predetermined spacing and the positions of the bottom surfaces of the hairlike bodies are arranged in an orderly fashion in the longitudinal direction and the transverse direction of the underlayer. Further, the form of arrangement of the hairlike bodies is not particularly limited and a grid arrangement arranged vertically and horizontally, a staggered arrangement, etc. can be selected. Due to the hairlike bodies being arranged regularly on the surface of the underlayer, a good tactile sensation is readily expressed, uniformly and without irregularities. Falling of the hairlike bodies occurs due to the application of a load such as, for example, tracing with a finger and finger marks in which the gloss and color tone differ from those of the surrounding portion can be formed. Further, due to the hairlike bodies, the tactile sensation can become like that of a suede-like napped sheet.

The average height (h) of the hairlike bodies is preferably 100-1,200 μm and more preferably 200-900 μm. By setting the average height to no less than 100 μm, a good tactile sensation can be sufficiently ensured and by setting the average height to no greater than 1,200 μm, a good tactile sensation such as moistness, softness, and fluffiness is obtained.

Figure 2:
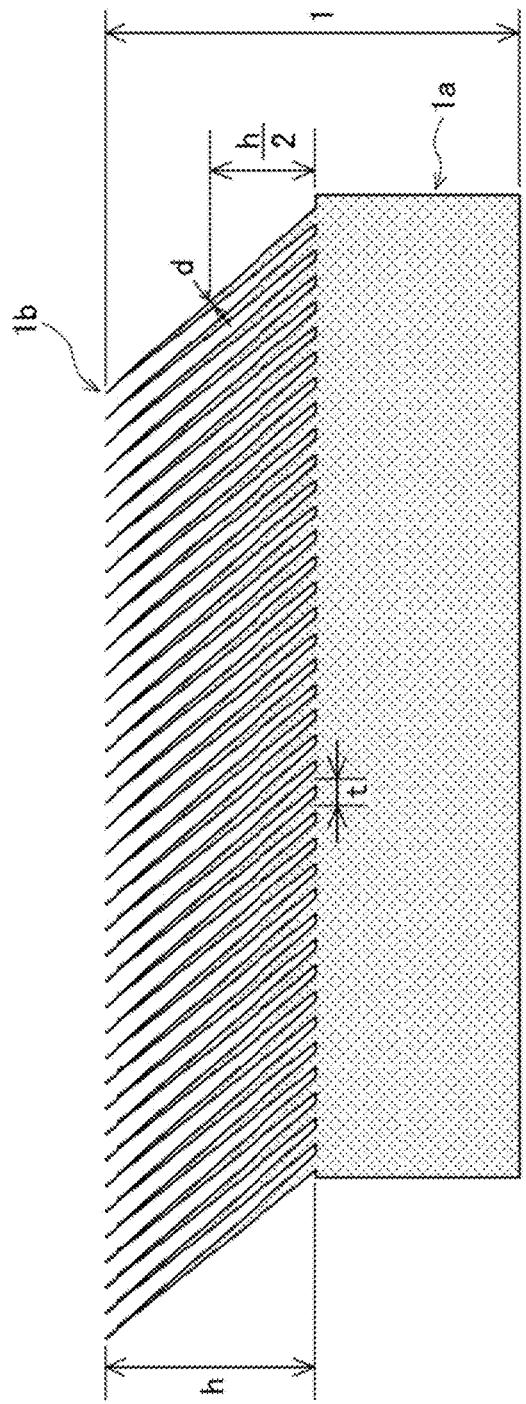
FIG. 2 is a simplified vertical side cross-sectional view showing a variation of the resin sheet according to the first embodiment of the present invention.
Figure 3:
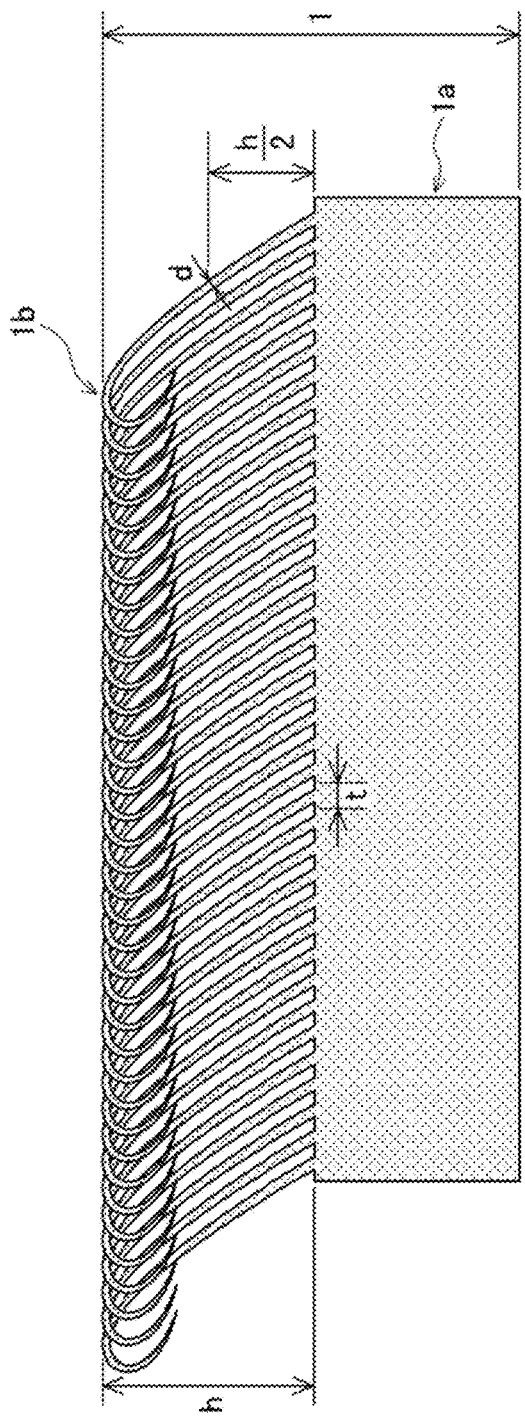
FIG. 3 is a simplified vertical side cross-sectional view showing a further variation of the resin sheet according to the first embodiment of the present invention.
Figure 4:
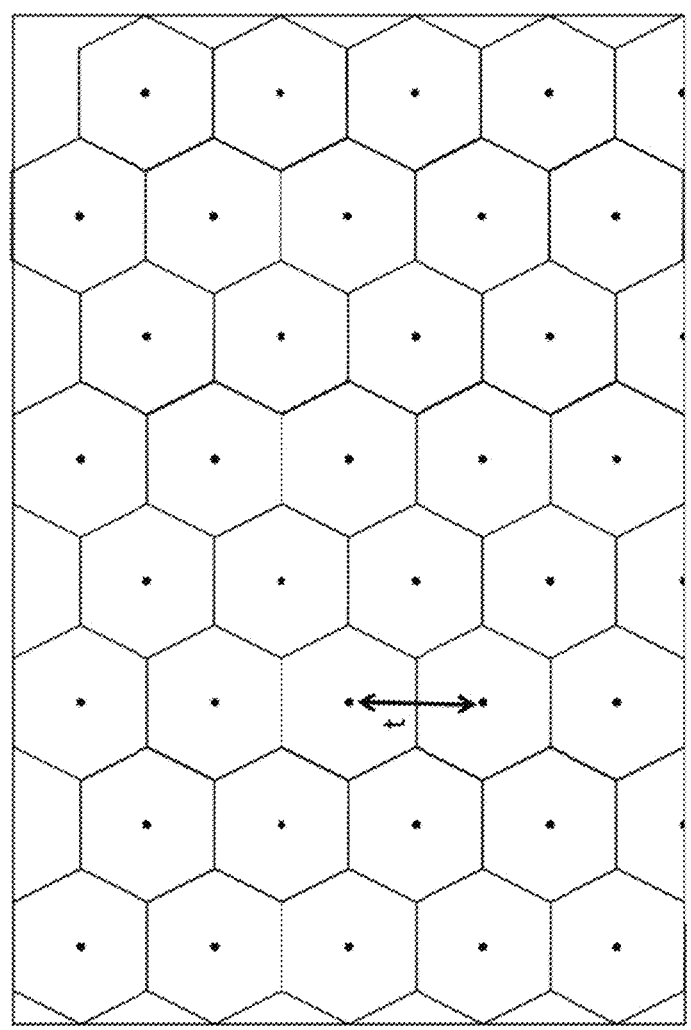
FIG. 4 is a simplified plan view of the resin sheet of FIG. 1.

When the hairlike bodies stand roughly straight with respect to the underlayer, the length of the hairlike bodies represents the height of the hairlike bodies. Meanwhile, when the hairlike bodies are slanted with respect to the underlayer as shown in FIG. 2 or the hairlike bodies have a portion that curls as shown in FIG. 3, the distance from the surface of the underlayer at the location of the hairlike bodies most removed from the surface of the underlayer is made the height h of the hairlike bodies.

The height of the hairlike bodies is measured at a number of locations on the resin sheet using an electron microscope and image processing software and an arithmetic average value of the measured values can be used as the average height of the hairlike bodies.

The average diameter (d) of the hairlike bodies is preferably 1-50 μm and more preferably 5-30 μm. By setting the average diameter of the hairlike bodies to no less than 1 μm, a good tactile sensation can be ensured and by setting the average diameter of the hairlike bodies to no greater than 50 μm, a good tactile sensation such as moistness, softness, and fluffiness is obtained. The diameter of the hairlike bodies is measured at mid-height (h/2) from several places on the resin sheet using an electron microscope and image processing software and an arithmetic average value of the measured values can be used as the average diameter of the hairlike bodies.

Further, the aspect ratio of the hairlike bodies when the hairlike bodies are standing roughly straight with respect to the underlayer can be represented as (average height of the hairlike bodies/average diameter of the hairlike bodies). When the hairlike bodies are slanted with respect to the underlayer or the hairlike bodies have a portion that curls, the aspect ratio can be represented as (average length of the hairlike bodies/average diameter of the hairlike bodies). The length of the hairlike bodies are measured at several places on the resin sheet using an electron microscope and image processing software and an arithmetic average of the measured values can be used as the average length of the hairlike bodies. In any case, the aspect ratio of the hairlike bodies is preferably 2-1,200, more preferably 10-600, and yet more preferably 40-200. By setting the aspect ratio to no less than 2, a good tactile sensation can be ensured and by setting the aspect ratio to no greater than 1,200, a good tactile sensation such as moistness, softness, and fluffiness is obtained.

Meanwhile, the average bottom surface diameter of the hairlike bodies can also be made a standard for the aspect ratio. The average bottom surface diameter of the hairlike bodies is preferably 10-150 μm. The average bottom surface diameter of the hairlike bodies is a value in which the spacing between neighboring hairlike bodies is measured at a number of locations on the resin sheet and an arithmetic average value of the measurements is used. The aspect ratio when the diameter of the bottom surface of the hair body is made the standard is preferably 1.0-120, more preferably 3-100, and still more preferably 15-80. By setting the aspect ratio to no less than 1.0, a good tactile sensation can be ensured and by setting the aspect ratio to no greater than 120, a good tactile sensation such as moistness, softness, and fluffiness is obtained.

The average spacing (t) between the hairlike bodies is preferably 20-200 μm and more preferably 40-150 μm. The spacing of the hairlike bodies means the distance from the center of the root of a hairlike body to the center of the root of a neighboring hairlike body. By setting the average spacing to no less than 20 μm, a good tactile sensation is ensured and by setting the average spacing to no greater than 200 μm, a good tactile sensation such as moistness, softness, and fluffiness is obtained. The average spacing of the hairlike bodies is a value in which the spacing between neighboring hairlike bodies is measured at a number of locations on the resin sheet and an arithmetic average value of the measurements is used.

The shape of the hairlike bodies is not particularly limited and may be configured to extend hairlike in a direction away from the underlayer in a shape in which the hairlike bodies gradually thin approaching the tip or in which a swelling is formed at the tip. In short, the hairlike bodies may have a shape in which the cross-sectional area gradually shrinks as the hairlike bodies deviate from the underlayer and then once again increases when the shape terminates. Further, the shape of the tip part of the hairlike bodies may be bud-shaped or mushroom-shaped. Moreover, the hairlike bodies may have a portion positioned at the base end extending in a direction away from the underlayer, a portion that extends from the portion positioned at the base end and is curved based on a fixed curvature or a curvature that gradually changes, and furthermore, a portion that is wound in a helix shape or a spiral shape. In this case, the tip parts of the hairlike bodies may have a shape that is folded inward. By having such a shape, a better tactile sensation is expressed. Further, due to the bud-shaped or mushroom-shaped portion being hollow, a better tactile sensation is expressed. When forming a bud-shaped or mushroom-shaped portion at the hairlike tips, it is preferable that ratio of the average diameter of the width of the bud shape or mushroom shape with respect to the average diameter of the hairlike bodies be no less than 1.1. The height of the bud shape or mushroom shape is preferably no less than 7 The average diameter of the hairlike bodies and the average diameter of the width and the height of the bud shape or mushroom shape are measured from a scanning electron microscope photograph and arithmetic average values are used. The hairlike bodies are made of a thermoplastic resin. The same resins that can be used in the underlayer can be used as the thermoplastic resin.

The underlayer and the hairlike bodies at least partially having a crosslinked structure means that the thermoplastic resin contained in the underlayer and the hairlike bodies forms at least partially a three-dimensional crosslinked structure (for example, a three-dimensional network structure). In a certain embodiment, at least a part of the hairlike body becomes a crosslinked body, in another embodiment, the entire surface of the hairlike body becomes a crosslinked body, and in yet another embodiment, the entirety of the hairlike body (from the boundary with the underlayer to the tip portion) becomes a crosslinked body. As methods of forming the crosslinked body, for example, a method of molding a resin sheet and then irradiating a surface having hairlike bodies with an electron beam and a method of adding an organic peroxide and forming a crosslinked body by heating and humidifying when or after a resin sheet is molded are cited. As a resin to which organic peroxide is added, "Lincron" manufactured by Mitsubishi Chemical Corporation, etc. are cited as commercially available products. In the present embodiment, it is preferable to form a crosslinked body (electron beam crosslinked body) by electron beam irradiation.

[Resin Sheet]

In the present embodiment, the thickness of the resin sheet is the sheet thickness combining the average height of the hairlike bodies and the average thickness of the underlayer. The sheet thickness is preferably 115-1,500 μm and more preferably 300-1,000 μm. By setting the thickness to no less than 115 μm, a good tactile sensation can be sufficiently ensured and by setting the thickness to no greater than 1,500 µm, manufacturing costs can be suppressed.

In the present embodiment, the "tactile sensation" means the feeling and texture of the surface of the resin sheet. When touching the surface of the resin sheet, whether comfortableness is felt is judged and, when felt, a good specific texture such as moistness, softness, or fluffiness is made the good tactile sensation. Further, the good tactile sensation can be specified by, other than a sensory evaluation of the texture, etc., the previously discussed aspect ratio, the ratio of the static friction coefficient with respect to the dynamic friction coefficient of the resin sheet, the value of the feeling of coldness or warmth to the touch, and the hardness of the resin.

The ratio of the static friction coefficient with respect to the dynamic friction coefficient of the resin sheet is preferably 1.0-10.0 and more preferably 1.8-5.0. By setting the ratio of the static friction coefficient with respect to the dynamic friction coefficient of the resin sheet to no less than 1.0, a good tactile sensation can be ensured. Further, by setting the ratio of the static friction coefficient with respect to the dynamic friction coefficient of the resin sheet to no greater than 10.0, a good tactile sensation such as moistness, softness, and fluffiness can be expressed.

Moreover, the static friction coefficient is preferably 0.2-2.0 and the dynamic friction coefficient is preferably 0.2-2.0.

The feeling of coldness or warmth to the touch of the resin sheet can be measured by measuring the heat transfer speed q-max ($J/cm^2 \cdot sec$) when in contact and a larger q-max value represents a colder feeling and a smaller q-max value represents a warmer feeling. Consequently, q-max is preferably 0.005-0.500 and more preferably 0.100-0.350. By setting the heat transfer speed of the resin sheet when in contact to no less than 0.005, a good tactile sensation such as moistness, softness, and fluffiness can be ensured. Further, by setting the heat transfer speed of the resin sheet when in contact to no greater than 0.500, a good tactile sensation such as moistness, softness, and fluffiness can be expressed.

The hardness of the resin can be measured with durometer hardness. In general, for resin hardnesses, soft resins such as elastomers are categorized into Shore hardness A type and hard resins such as PP are categorized into Shore hardness D type. The resin hardness (hardness) is preferably a hardness of 45-95 in Shore hardness A. By using a resin in the above hardness range, a good tactile sensation such as moistness, softness, and fluffiness can be expressed.

Second Embodiment

Figure 5:
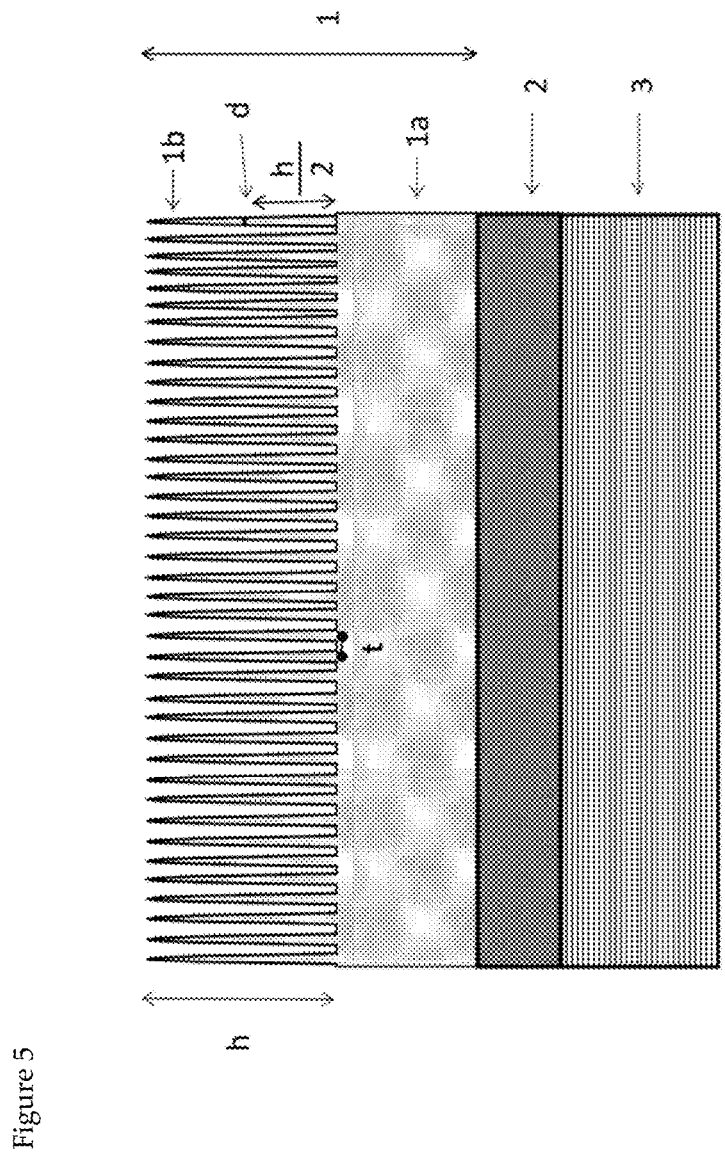
FIG. 5 is a simplified vertical side cross-sectional view showing the layer structure of a resin sheet according to the second embodiment of the present invention.

An example of the resin sheet as in the second embodiment of the present invention is a resin sheet in which a sealant resin layer (2) is formed between the underlayer (1) and the substrate layer (3), as shown in FIG. 5. That is, the layer configuration of the resin sheet as in the second embodiment is, from top to bottom, the hairlike bodies and the underlayer (1), the sealant resin layer (2), and the substrate layer (3). Here, the hairlike bodies are the same as those explained in the first embodiment, so explanation thereof is omitted. However, the thickness of the hairlike bodies and the underlayer represented by the total of the average height of the hairlike bodies and the average thickness of the underlayer is preferably 115-900 µm. By setting the thickness to no less than 115 µm, a good tactile sensation can be ensured and by setting the thickness to no greater than 900 µm, production costs can be suppressed.

<Substrate Layer>

The substrate layer is preferably a thermoplastic resin such as a styrenic resin, an olefinic resin, a polyesteric resin, a nylon-based resin, an acrylic resin, or a thermoplastic elastomer. Further, when laminating, there is lamination by coextrusion molding and lamination by extrusion laminate molding or dry laminate molding using a non-stretched film or a biaxially stretched film.

Polyethylene terephthalate, polybutylene terephthalate, polyethylene-2,6-naphthalate, polymethylene terephthalate, and a polyester resin in which, as copolymerization components, for example, a diol component such as diethylene glycol, neopentyl glycol, and polyalkylene glycol and a dicarboxylic acid component such as adipic acid, sebacic acid, phthalic acid, isophthalic acid, and 2,6-naphthalene dicarboxylic acid are copolymerized can be used as the polyesteric resin.

A lactam polymer such as caprolactam and laurolactam, an aminocarboxylic acid polymer such as 6-aminocaproic acid, 11-aminoundecanoic acid, and 12-aminododecanoic acid, a polycondensate of a diamine unit such as an aliphatic diamine such as hexamethylenediamine, decamethylenediamine, dodecamethylenediamine, and 2,2,4- or 2,4-4-trimethylhexamethylenediamine, an alicyclic diamine such as 1,3- or 1,4-bis(aminomethyl)cyclohexane or bis(p-aminocyclohexylmethane), or an aromatic diamine such as m- or p-xylylenediamine, and a dicarboxylic acid unit such as an aliphatic dicarboxylic acid such as adipic acid, suberic acid, and sebacic acid, an alicyclic dicarboxylic acid such as cyclohexanedicarboxylic acid, and an aromatic dicarboxylic acid such as terephthalic acid and isophthalic acid, and copolymers, etc. thereof can be used as the nylon-based resin. For example, there are nylon 6, nylon 9, nylon 11, nylon 12, nylon 66, nylon 610, nylon 611, nylon 612, nylon 6T, nylon 6I, nylon MXD6, nylon 6/66, nylon 6/610, nylon 6/6T, nylon 6I/6T, etc. and among these, nylon 6 and nylon MXD6 are suitable.

If the polymer is a vinyl polymer based on methacrylic ester monomers, it can be used as an acrylic resin and the structure thereof is not particularly limited. As the methacrylic ester monomers, there are, for example, methyl methacrylate, ethyl methacrylate, propyl methacrylate, butyl methacrylate, pentyl methacrylate, hexyl methacrylate, etc. Further, the alkyl group such as a propyl group, butyl group, pentyl group, or hexyl group in the methacrylic ester monomer may be straight chain or may be branched. The methacrylic ester resin may be a homopolymer of a methacrylic ester monomer or a copolymer of multiple methacrylic ester monomers and may have monomer units derived from known vinyl compounds other than methacrylic ester such as ethylene, propylene, butadiene, styrene, α-methylstyrene, acrylonitrile, and acrylic acid.

The substrate layer may be alloyed with the abovementioned thermoplastic resins at any ratio in a range that does not inhibit the effects of the present invention, as necessary. Furthermore, the substrate layer may contain other additives. Additives such as water/oil repellents, a colorant such as pigment or dye, a lubricant/mold release agent such as silicon oil or alkyl ester-based material, a fibrous reinforcement agent such as glass fibers, granular fine particles such as talc, clay, or silica or scaly fine particles such as mica as a filler, a low-molecular type antistatic agent such as a salt compound of sulfonic acid and an alkali metal or the like or a high-molecular type antistatic agent such as polyether ester amide, an ultraviolet absorbing agent, a flame retardant, an antibacterial agent, an antiviral agent, and a thermal stabilizer may be added as other additives in a range that does not inhibit the effects of the present invention. Furthermore, scrap resins generated in a resin sheet manufacturing process can be mixed and used.

Further, in the present embodiment, the base material layer may partially have a crosslinked structure in a range that does not inhibit the effects of the present invention.

<Sealant Resin Layer>

The sealant resin layer is to cause adhesion between the underlayer and the substrate layer to be expressed and a modified olefinic resin, a hydrogenated styrenic thermoplastic elastomer, etc. can be used as resin components.

Olefinic resins such as olefins with about 2-8 carbon atoms such as ethylene, propylene, and butene-1, copolymers of these olefins and other olefins with about 2-20 carbon atoms such as ethylene, propylene, butene-1, 3-methylbutene-1, pentene-1, 4-methylpentene-1, hexene-1, octene-1, and decene-1 or copolymers of these olefins and vinyl compounds such as vinyl acetate, vinyl chloride, acrylic acid, methacrylic acid, acrylic ester, methacrylic ester, and styrene, and olefinic rubbers such as ethylene-propylene copolymers, ethylene-propylene-diene copolymers, ethylene-butene-1 copolymers, and propylene-butene-1 copolymers modified under graft reaction conditions with unsaturated carboxylic acids such as acrylic acid, methacrylic acid, crotonic acid, isocrotonic acid, maleic acid, fumaric acid, itaconic acid, citraconic acid, and tetrahydrophthalic acid or derivatives of the acids such as halides, amides, imides, anhydrides, and esters, specifically, malonyl chloride, maleimide, maleic anhydride, citraconic anhydride, monomethyl maleate, dimethyl maleate, and glycidyl maleate can be used as the modified olefinic resin.

Among these, an "ethylene-propylene-diene copolymer" or ethylene-propylene or butene-1 copolymer rubber modified with an unsaturated dicarboxylic acid or an anhydride thereof, in particular maleic acid or an anhydride thereof, is suitable.

A hydrogenated copolymer of a styrenic monomer and butadiene or isoprene, a hydrogenated styrene-butadiene-styrene block copolymer (styrene-ethylene/butylene-styrene block copolymer), a hydrogenated styrene-isoprene-styrene block copolymer (styrene-ethylene/propylene-styrene block copolymer), etc. can be used as the hydrogenated styrenic thermoplastic elastomer and, in particular, a styrene-ethylene/butylene-styrene block copolymer is preferable.

The thickness of the sealant resin layer is preferably 20-90 μm and more preferably 40-80 μm. By setting the average thickness to no less than 20 μm, the occurrence of interlayer separation between the underlayer and the substrate layer can be suppressed and by setting the average thickness to no greater than 90 μm, production costs can be suppressed.

Each of the abovementioned thermoplastic resins may be alloyed, as necessary, with the sealant resin layer in any ratio in a range that does not inhibit the effects of the present invention. Furthermore, other additives may be contained. Additives such as a water repellent, an oil repellent, a colorant such as pigment or dye, a lubricant/mold release agent such as silicon oil or an alkyl ester-based material, a fibrous reinforcement agent such as glass fibers, granular fine particles such as talc, clay, or silica or scaly fine particles such as mica as a filler, a low-molecular type antistatic agent such as a salt compound of sulfonic acid and an alkali metal or the like or a high-molecular type antistatic agent such as polyether ester amide, an ultraviolet absorbing agent, a flame retardant, an antibacterial agent, an antiviral agent, and a thermal stabilizer may be added as other additives in a range that does not inhibit the effects of the present invention. Further, in the present embodiment, the sealant resin layer may partially have a crosslinked structure in a range that does not inhibit the effects of the present invention.

Third Embodiment

Figure 6:
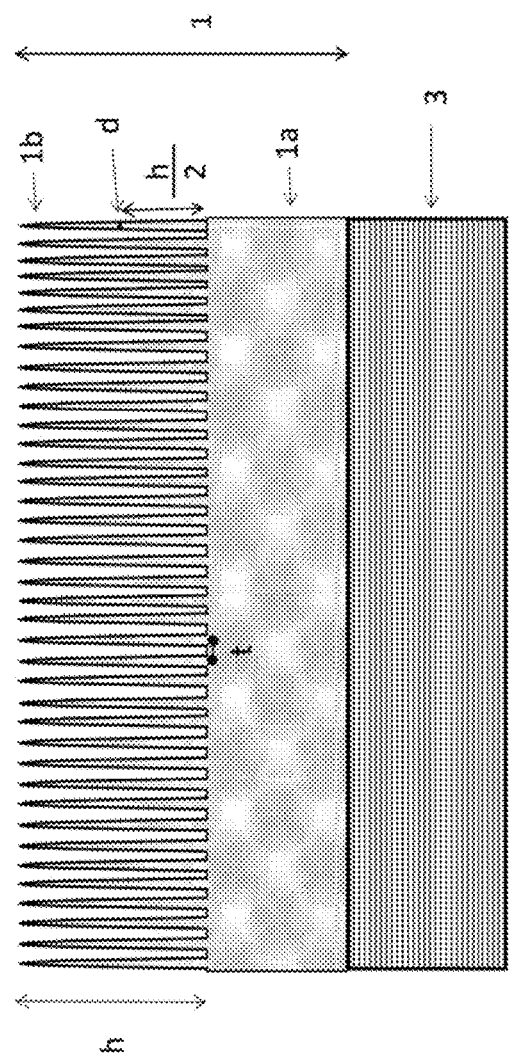
FIG. 6 is a simplified vertical side cross-sectional view showing the layer structure of a resin sheet according to the third embodiment of the present invention.
Figure 7:
FIG. 7 is a photograph of a table member used for molding evaluation.
Figure 8:
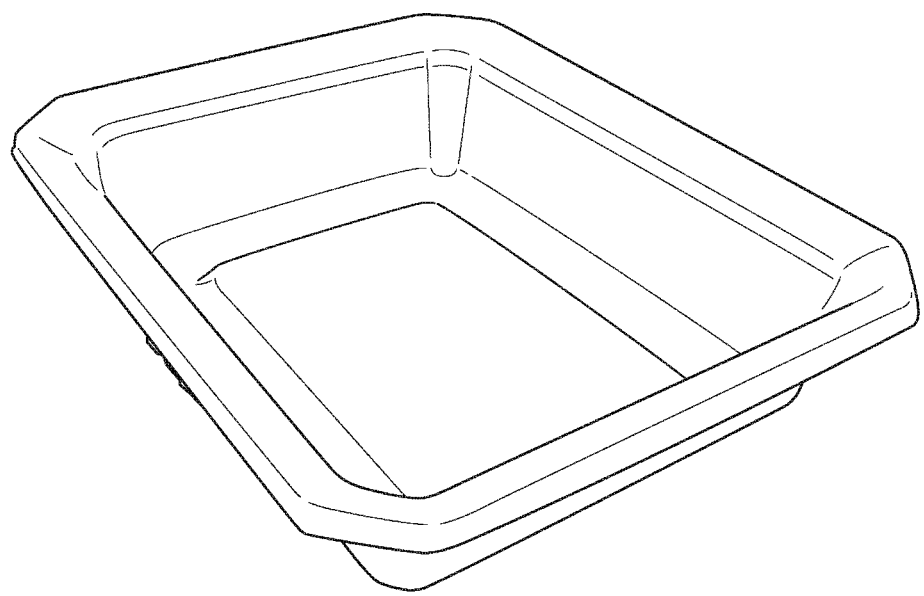
FIG. 8 is a photograph of a container for miscellaneous goods used for molding evaluation.

The resin sheet as in a third embodiment of the present invention is one in which the hairlike bodies and underlayer (1) and the substrate layer (3) are directly laminated without using the sealant resin sheet (2) indicated in the second embodiment, as shown in FIG. 6. That is, the layer configuration of the resin sheet as in the third embodiment is, from top to bottom, the hairlike bodies and underlayer (1)/the substrate layer (3) and is the layer configuration for the thermoplastic resin sheet as in the second embodiment from which the sealant resin layer has been removed. Here, the hairlike bodies and underlayer are the same as those in the first embodiment and the second embodiment, so explanation thereof is omitted. Meanwhile, the substrate layer (3) in the present embodiment is preferably a layer provided with sufficient adhesion with the underlayer.

Further, in the resin sheet as in the third embodiment, using a thermoplastic resin with excellent adhesion with the underlayer as the substrate layer is preferable. For example, when the underlayer is a urethanic thermoplastic elastomer, an ABS resin can be used. When the underlayer is a fluorine resin, an acrylic resin can be used. When the underlayer is an olefinic resin, a hydrogenated styrene thermoplastic elastomer can also be used. When a styrenic resin and a hydrogenated styrenic thermoplastic elastomer are used in combination, it is preferable to add 5-10 parts by mass of the hydrogenated styrenic thermoplastic elastomer to 90-95 parts by mass of the styrenic resin. In this case, by setting the amount of the hydrogenated styrenic thermoplastic elastomer to no less than 5 parts by mass, adhesion with the underlayer becomes sufficient and the occurrence of interlayer separation can be suppressed and by setting the amount to no greater than 10 parts by mass, the production costs can be suppressed.

The substrate layer may be alloyed with each of the abovementioned thermoplastic resins at any ratio in a range that does not inhibit the effects of the present invention, in the same manner as the second embodiment. Furthermore, other additives may be contained. Additives such as a water repellent, an oil repellent, a colorant such as pigment or dye, a lubricant/mold release agent such as silicon oil or an alkyl ester-based material, a fibrous reinforcement agent such as glass fibers, granular fine particles such as talc, clay, or silica or scaly fine particles such as mica as a filler, a low-molecular type antistatic agent such as a salt compound of sulfonic acid and an alkali metal or the like or a high-molecular type antistatic agent such as polyether ester amide, an ultraviolet absorbing agent, a flame retardant, an antibacterial agent, an antiviral agent, and a thermal stabilizer can be added as the other additives in a range that does not inhibit the effects of the present invention. Moreover, in the present embodiment, the substrate layer may partially have a crosslinked structure in a range that does not inhibit the effects of the present invention.

[Resin Sheet Manufacture]

The manufacturing method for the resin sheet as in the present invention is not limited and may be any method, but typically comprises steps for melt-extruding a raw resin and adding the regularly arranged hairlike bodies to at least one surface of the obtained extruded resin sheet.

In the manufacture of a single layer sheet or a multilayer sheet, any resin sheet molding method can be used. For example, there are methods for melting and extruding raw resins using a single-screw extruder when the sheet is single layer and multiple single-screw extruders when the sheet is multilayer and obtaining a resin sheet with a T-die. When the sheet is multilayer, a feed block or a multi-manifold die can be used. Moreover, the layer configurations of the embodiments of the resin sheet of the present application are basically as discussed previously, but beyond these, for example, scrap material generated in a manufacturing process for the resin sheet or molded container of the present invention may be added to the substrate layer and laminated as a further layer so long as degradation of the physical properties, etc. is not observed.

The method for adding the hairlike bodies is not particularly limited and any method known by a person skilled in the art can be used. For example, there are a method for manufacturing using an extrusion molding technique, a method for manufacturing using a roll-to-roll technique, a method for manufacturing using a photolithography technique, a method for manufacturing using a hot pressing technique, a method for manufacturing using a pattern roll and a UV curable resin, a method for manufacturing using a 3D printer, a method for covalently bonding with a polymerization reaction after embedding the hairlike bodies in the resin layer, etc.

For example, when using an extrusion molding technique, the resin sheet as in the present invention can be manufactured by extruding a resin sheet with a T-die technique and casting with a transfer roll on which a relief process has been performed and a touch roll so as to add the shapes of hairlike bodies to a surface of the resin sheet.

A roll on which a micro-relief has been applied regularly on a surface thereof with a laser engraving or electrocasting method, an etching method, a mill engraving method, etc. can be used as the transfer roll on which a relief process has been performed. Here, regular means that the relief is an arranged state that is not random, that is, is arranged in an orderly fashion in one direction or in two directions. The arrangement of the relief in a certain embodiment can be selected from a grid arrangement arranged vertically and horizontally, a staggered arrangement, etc. As the shape of the relief part, there are, for example, if a concavity, funnel-shapes (cone, quadrangular pyramid, triangular pyramid, hexagonal pyramid, etc.), semicircles, rectangles (quadrangular prism), etc. As the size thereof, the diameter of the opening of the concavity, the depth of the concavity, and the spacing of the concavity shapes are from micrometers to hundreds of micrometers. The spacing of the hairlike bodies can be adjusted by adjusting the spacing of the concavities on the transfer roll and the height of the hairlike bodies can be adjusted by adjusting the depth of the concavities on the transfer roll, and the tactile sensation can also be adjusted thereby.

Further, it is preferable that a relief process with a high aspect ratio be performed on the transfer roll surface. For example, the aspect ratio (concavity depth/concavity opening diameter) when working concavity shapes into the transfer roll surface is preferably 1.0-9.0. In performing a high aspect ratio relief process on the transfer roll surface, in comparison with an etching method, a blasting method, a mill engraving method, etc., a laser engraving method or an electrocasting method is suitable when performing fine work in the depth direction and thus is particularly suitably used.

For example, a metal, a ceramic, etc. can be used as the material of the transfer roll. Meanwhile, various materials can be used as the touch roll, for example, a roll made from silicon-based rubber, NBR-based rubber, EPT-based rubber, butyl rubber, chloroprene rubber, or fluorine rubber can be used. In a certain embodiment, a touch roll with a rubber hardness (JIS K 6253) of 40-100 can be used. Further, a teflon layer may be formed on the surface of the touch roll.

The resin sheet of the present embodiment can be manufactured by using a roll set of the above transfer roll and touch roll.

In a certain embodiment, the resin sheet of the present embodiment can be manufactured by adjusting the temperature of the transfer roll to a temperature close to the crystal melting temperature, glass transition point, or melting point of the thermoplastic resin (for example, 90-150° C. when straight chain medium-density polyethylene is used) and casting with the pinch pressure between the transfer roll and the touch roll set to 30-150 Kgf/cm. The cast resin sheet is taken in at a line speed of 0.5-30 m/minute using a pinch roll, etc.

Further, while the above embodiments were shown specifically, the present invention is not limited thereto.

Next, in order to retain the hairlike bodies and maintain a desired tactile sensation even after the heat-stretch molding, a crosslinking treatment is performed so that at least part of the hairlike bodies and the underlayer become a crosslinked body. This crosslinking treatment is preferably performed by irradiating a sheet surface of the resin sheet where the hairlike bodies and the underlayer are present with an electron beam.

Similar to polyvinylidene fluoride, polymethyl acrylate, polyvinyl chloride, polybutadiene, vinyl alcohol, polyamide, polyurethane, etc., polyolefin is a crosslinking polymer in which molecular chain crosslinking proceeds preferentially due to electron beam irradiation. Among these materials, a straight chain low-density polyethylene, a straight chain medium-density polyethylene, a random polypropylene, and a block polypropylene are easily crosslinked, and, particularly, a straight chain low-density polyethylene is most readily crosslinked. Therefore, the polyolefinic resin is suitable for forming a crosslinked body and, among these materials, polyethylene and polypropylene are preferable.

The conditions for electron beam irradiation on the resin composition are preferably that the acceleration voltage is 110-250 kV and the dose is 120-350 kGy. By irradiating the surface of the resin sheet with an electron beam in this condition range, the hairlike bodies and the underlayer at least partially have a crosslinked structure and a resin sheet that maintains hairlike bodies even after heat-stretch molding can be manufactured. Further, within the above condition range, even when a single-layer resin sheet is irradiated with an electron beam from a surface side on which the hairlike bodies are formed, there is no possibility that the electron beam will affect the physical properties, etc. because the irradiation amount of the electron beam directed to a surface opposite the surface on which the hairlike bodies are formed is small. Moreover, within the above condition range, even when a multilayered resin sheet is irradiated with an electron beam from a surface side on which the hairlike bodies are formed, there is no possibility that the electron beam will affect interlayer adhesion performance, etc. because the irradiation amount of the electron beam directed to the sealant resin layer and/or the substrate layer is small. In contrast, under irradiation conditions weaker than these, it is impossible to crosslink the hairlike bodies to the extent that the shapes thereof are largely maintained even after the heat-stretch molding, whereas under irradiation conditions stronger than these, the good tactile sensation of the resin sheet may lower and the resin sheet may fracture during heat-stretching. Here, the degree of crosslinking of the hairlike bodies and the underlayer is not particularly limited, but it is preferable that the crosslinking is performed to the extent that the texture can be sufficiently maintained after heat-stretch molding.

Here, the crosslinking treatment is not particularly limited. For example, the crosslinking treatment is performed to the extent that when the resin sheet is heated at a sheet surface temperature of 60-220° C. for 20-480 seconds and stretched at a draw ratio of 1.05-2.50 times, the average height of the hairlike bodies or the average length of the hairlike bodies before and after the stretching is sufficiently maintained. The reduction rate of the average height of the hairlike bodies or the average length of the hairlike bodies is preferably less than 30%, more preferably 25% or less, and still more preferably 20% or less. The abovementioned draw ratio is defined as the draw ratio of the most stretched portion in the molded product.

The reduction rate of the average height of the hairlike bodies or the average length of the hairlike bodies can be calculated with the following formula I.

The reduction rate of the average height of hairlike bodies or the average length of hairlike bodies= (the average height of hairlike bodies or the average length of hairlike bodies before heat-stretch molding−the average height of hairlike bodies or the average length of hairlike bodies at the most stretched portion of the molded product)/(the average height of hairlike bodies or the average length of hairlike bodies before heat-stretch molding)×100     (I)

[Molded Product]

The molded product of the present invention is a molded product using the resin sheet according to the present invention. The resin sheet of the present invention is adaptable to general molding. In addition to insert molding and in-mold molding, general vacuum molding and pressure molding and further, as an application of these methods, a method of heating and softening a resin sheet in a vacuum state and releasing the resin sheet under atmospheric pressure to overlay (mold) the resin sheet on a surface of an existing molded product can also be cited as molding methods. However, the molding method is not limited thereto. Further, a publicly known sheet heating method such as radiant heating with an infrared heater or the like, which is non-contact heating, can be applied as a method of heating and softening a sheet before molding. In vacuum pressure molding according to a certain embodiment, for example, a resin sheet is heated at a surface temperature of 60-220° C. for 20-480 seconds and the resin sheet is then molded to an existing molded product surface, whereby the resin sheet can be stretched to 1.05-2.50 times depending on the surface shape.

[Product]

The resin sheet to which the hairlike bodies have been provided to a surface thereof of the present invention can be applied to uses requiring the good tactile sensation indicated above. For example, the resin sheet of the present invention can be applied as an automobile interior member, an electronic device, an electronic device cladding, a cosmetic container or a container member, a stationery member, or a livingware member.

As the automobile interior member, a portion which is touched by hands inside an automobile is cited, such as steering wheels, dashboards, levers, and switches. For example, an interior member in which the abovementioned resin sheet is attached to a publicly known instrument panel or pillar can be cited. By attaching the resin sheet, an interior member to which a good tactile sensation has been added can be configured. As the material of the resin sheet to be attached, in consideration of weather resistance and chemical resistance, an olefinic resin, a vinyl chloride-based resin, or a urethanic elastomer is preferable. The method of attaching the resin sheet and the interior member is not particularly limited.

As the electronic device cladding, a smartphone housing, a smartphone case, a music player case, a game console housing, a digital camera housing, an electronic notebook housing, a calculator housing, a tablet housing, a mobile computer housing, a keyboard, a mouse, etc. are cited. For example, a game console part in which the resin sheet of the present invention is attached to a publicly known game console base can be cited. By attaching the resin sheet, a game console part to which a good tactile sensation has been added can be configured. An olefinic resin or a urethanic elastomer is preferable as the material of the resin sheet to be attached. The method of attaching the resin sheet and the game console part is not particularly limited.

As the cosmetic container member, containers for face cream, pack cream, foundation, and eyeshadow are cited, and, for example, a cosmetic container in which the resin sheet of the present invention has been attached to a lid member of a publicly-known container for foundation can be cited. By attaching the resin sheet, a cosmetic container to which a good tactile sensation has been added can be configured. An olefinic resin or a urethanic elastomer is preferable as the material of the resin sheet to be attached. The method of attaching the resin sheet is not particularly limited.

As the stationery member, a book cover, a notebook cover, a pen case cover, etc. are cited and, for example, a publicly-known book cover can be manufactured by using the resin sheet of the present invention, thereby configuring a book cover to which a good tactile sensation and waterproofing have been added. An olefinic resin or a urethanic elastomer is preferable as the material of the sheet. The method of manufacturing by using the resin sheet is not particularly limited.

Lighting devices for indoor and in-vehicle use are cited as the lighting device member. For example, a lighting device in which the resin sheet of the present invention has been attached to a cover member of a publicly-known LED lighting device can be cited. By attaching the resin sheet, an LED lighting device to which a good tactile sensation and light diffusion have been added can be configured. An olefinic resin or a fluorine-based resin is preferable as the material of the resin sheet to be attached. The method of attaching the resin sheet is not particularly limited.

As the livingware member, a bathroom article, an indoor mat, a table sheet, etc. are cited. For example, a bathroom apparatus in which the resin sheet of the present invention is attached to a toilet seat member of the bathroom apparatus can be cited. By attaching the resin sheet, a bathroom apparatus having a toilet seat to which a good tactile sensation has been added can be configured. An olefinic resin, a vinyl chloride resin, and a fluorine-based resin are preferable as the material of the resin sheet to be attached. The method of attaching the resin sheet is not particularly limited.

Furthermore, a hairlike body sheet on which text or a pattern is printed by a general printing method (an offset printing method, a gravure printing method, a flexographic printing method, a screen printing method, foil stamping, etc.) can be manufactured, and applied to the above uses. The material of the resin sheet to be printed on is not particularly limited, but it is preferable to consider the printability between the resin sheet and the ink to be used in printing.

Further, by manufacturing a laminated body in which the resin sheet of the present invention is laminate molded (dry laminate molding or extrusion laminate molding) with a printed article on which text, a pattern, or the like is printed (such as paper or a metal thin film), a non-woven cloth, or the like, for example, by laminate molding on a printed surface of a business card, a business card having a tactile sensation can be manufactured. The material of the resin sheet to be laminated is not particularly limited.

EXAMPLES

The present invention shall be described in more detail below using examples and comparative examples, but the present invention is not at all limited by the details of the examples, etc.

The raw materials used in the examples, etc. are as follows.
(1) Hairlike Bodies and Underlayer
- (A-1) Random PP "PM822V" (manufactured by SunAllomer Ltd.)
- (A-2) Block PP "PM854X" (manufactured by SunAllomer Ltd.)
- (B-1) Straight chain medium-density PE (C4) "Neozex 45200" (manufactured by Prime Polymer Co., Ltd.)
- (B-2) Straight chain low-density PE (C6) "Ultrazex 20200J" (manufactured by Prime Polymer Co., Ltd.)
- (C) Styrenic thermoplastic elastomer "SE Polymer AC15" (manufactured by Denka Company Limited)
- (D) PVC "BFV7070N" (manufactured by RIKEN TECHNOS CORP.)
- (E) PVDF "KYNAR FLEX 2800" (manufactured by ARKEMA K.K.)
- (F-1) TPU (urethanic elastomer) "ET880: Polyetheric" (manufactured by BASF SE)
- (F-2) TPU (urethanic elastomer) "ET680: Polyester" (manufactured by BASF SE)
- (G) Colorant "PE-M-SAC GW1060 White" (manufactured by Dainichiseika Color & Chemicals Mfg. Co., Ltd.)
- (H) Colorant "PE-M-MD1697 Red" (manufactured by Dainichiseika Color & Chemicals Mfg. Co., Ltd.)
- (I) Colorant "PE-M-MC6164 Yellow" (manufactured by Dainichiseika Color & Chemicals Mfg. Co., Ltd.)
- (J) Colorant "PEX 1AG057 PEARL" (manufactured by TOKYO PRINTING INK MFG CO., LTD.)
- (K) Colorant "PEX 496 SILVER AL" (manufactured by TOKYO PRINTING INK MFG CO., LTD.)
- (L-1) Colorant "Elastollan Master Color Black 590M50" (manufactured by FCI Co., Ltd.)
- (L-2) Colorant "Elastollan Master Color White 880M50" (manufactured by FCI Co., Ltd.)
- (L-3) Weather resistance master "Weather Resistance Master UNS (Polyesteric)" (manufactured by FCI Co., Ltd.)
- (L-4) Weather resistance master "Weather Resistance Master UNE (Polyetheric)" (manufactured by FCI Co., Ltd.)
- (M) Water repellent "Clinbell CB50-PP" (manufactured by Fuji Chemical Industries, Ltd.)
- (N) Antistatic agent "Pelestat 230" (manufactured by Sanyo Chemical Industries, Ltd.)
- (O) Antibacterial agent "Bactekiller BM102VT" (manufactured by Fuji Chemical Industries, Ltd.)
- (P) Mold release agent "Elastollan Master V" (manufactured by FCI Co., Ltd.)
- (Q) Ultraviolet absorbing agent Triazine-based ultraviolet absorbing agent "TINUVIN 1600" (manufactured by BASF Inc.)

(2) Sealant Resin Layer
- (R-1) Hydrogenated styrenic thermoplastic elastomer "Tuftec M1943" (manufactured by Asahi Kasei Corporation)
- (S-1) Modified olefinic polymer resin "MODIC F502" (manufactured by Mitsubishi Chemical Corporation)
- (S-2) Modified olefinic polymer resin "ADMER SE810" (manufactured by Mitsui Chemicals, Inc.)
- (R-2) Hydrogenated styrenic thermoplastic elastomer "Tuftec P2000" (manufactured by Asahi Kasei Corporation)

(3) Substrate Layer
- (T) SBC "CLEAREN 730L" (manufactured by Denka Company Limited)
- (U) GPPS "G100C" (manufactured by TOYO-STYRENE CO., LTD.)
- (V) PET film "Lumirror" (manufactured by TORAY INDUSTRIES, INC.)
- (W) Nylon 6 film "Harden" (manufactured by TOYOBO CO., LTD.)
- (X) PMMA "HBS000" (manufactured by Mitsubishi Chemical Corporation)
- (Y) ABS "GR-T-61A" (manufactured by Denka Company Limited)

The evaluation methods for the various characteristics of the resin sheets and the molded products to which the resin sheets are vacuum molded manufactured in the examples and comparative examples are as follows.

(1) Average Height of Hairlike Bodies, Average Diameter of Hairlike Bodies, Average Spacing of Hairlike Bodies, Average Thickness of the Underlayer, Reduction Rate of the Average Height of Hairlike Bodies after Heat-Stretch Molding The height (h) of hairlike bodies of a resin sheet, the diameter (d) of the hairlike bodies, the spacing (t) of the hairlike bodies, the thickness of the underlayer, and the height of the hairlike bodies after heat-stretch molding were measured by using a field emission-type scanning electron microscope (FE-SEM JSM-7001F manufactured by JEOL Ltd.). The measured samples were cross-sectional slices cut from the resin sheets at three random locations with a microtome. The average height of the hairlike bodies was determined by measuring the height of 10 hairlike bodies of each sample and using the arithmetic average value of the 30 measurement values. The average diameter of the hairlike bodies was measured by measuring the diameter of 10 hairlike bodies of each sample at mid-height (h/2) and calculating the average value of the 30 measurements. The average spacing of the hairlike bodies was measured by measuring the distance from the center of the root of one hairlike body to the center of the root of a neighboring hairlike body at 10 locations of each sample and calculating the average value of the 30 measurements. The average thickness of the underlayer was measured by measuring the thickness from the roots of the hairlike bodies to the other layer interface at 10 locations of each sample and calculating the average value of the 30 measurements.

With respect to the reduction rate of the average height of the hairlike bodies after heat-stretch molding, cross-sectional slices were cut out from three random locations at the most stretched portion of a vacuum-molded molded product, and the average height of the hairlike bodies of the slices was determined by measuring the height of 10 hairlike bodies for each of the samples and using the arithmetic average value of the 30 measurement values. The reduction rate was calculated by using the above formula I.

(2) Good Tactile Sensation Sensory Evaluation

A functional evaluation of the good tactile sensation was performed by having a total of 30 people, 15 men and 15 women, touch the resin sheets. When touching the surfaces of the resin sheets, whether comfortableness was felt was judged with "o" and "x", when judged with "o", the resin sheet was evaluated with a specific texture such as moistness, softness, or fluffiness. When evaluated with the same texture by no less than 80% of the evaluators, the resin sheet was evaluated as having that texture. Further, whether the same texture was also maintained on the surface of the molded products which were vacuum molded using the resin sheets was evaluated.

(3) Ratio of Static Friction Coefficient with Respect to the Dynamic Friction Coefficient Using a static friction measurement instrument "TL201 Ts (manufactured by Trinity-Lab Inc.), the resin sheets were attached to the table thereof with the surface to which the hairlike body shapes, etc. were added facing up. Using a contact made of urethane (durometer hardness: 32±2), the table was moved at a speed of 10 mm/second while applying a load of 100 g and the static friction coefficient and the dynamic friction coefficient were measured.

(4) Measuring Coldness or Warmth to the Touch (Heat Transfer Speed: q-Max)

Using a finger robot thermolab (manufactured by KATO TECH CO., LTD.), the resin sheet samples were placed on the sample stage set to 20° C. for 5 minutes and after temperature adjustment of the resin sheets, contacted with a 30° C. contact temperature sensor (1 mm×1.5 mm), and the heat transfer speed (q-max) was measured over 0.2 seconds.

(5) Resin Hardness

The hardness of the resins was measured in accordance with JIS K 7215 by manufacturing samples having a thickness of 6 mm, a width of 25 mm, and a length of 50 mm with a hot pressing method and measuring using a type A durometer.

(6) Measurement of Diffusivity of Reflected Light

An automatic goniometer (GP-200: MURAKAMI COLOR RESEARCH LABORATORY) was used to obtain the angular width (degree) and the peak height from a rising start angle to a falling end angle of a reflection peak measured under the conditions of reflection measurement mode, light incident angle: 45°, light receiving angle: −90-90°, SENSITIVITY: 150, HIGH VOLTON: 500, filter: ND10 used, light-flux diaphragm: 10.5 mm (VS-13.0), light-receiving diaphragm: 9.1 mm (VS-34.0), and an angle changing interval of 0.1 degree. From these results, the angular width at which the reflection intensity was 1% or more was calculated, and the angular width was defined as the angular width having diffusivity.

(7) Contact Angle

The contact angle of the resin sheets was measured using an automatic contact angle meter DM-501 (manufactured by Kyowa Interface Science, Inc.). Further, purified water was used as the test liquid and the drop amount was set to 6 µL. If the contact angle was 120° or greater, the liquid repellency was high and the resin was judged to be capable of preventing the adhesion of liquids.

(8) Surface Resistivity

The surface resistivity of the surfaces of the resin sheets was measured in accordance with JIS K 6911 at an atmospheric temperature of 23° C., an atmospheric humidity of 50% R.H., and an applied voltage of 1,000 V.

(9) Antibacterial Evaluation

Evaluation was performed with a film adhesion method in accordance with JIS K 2801. Various bacterial liquids were dropped onto a film surface 5 cm×5 cm with a thickness no greater than 1 mm and the number of living bacteria was measured after the surface was covered with a polyethylene film and stored at 35° C.

(10) Weather Resistance

A weather resistance test was performed by using a "Xenon Arc Lamp" (manufactured by TOYO SEIKI Co., Ltd.). A color difference measurement was performed on the resin sheets using a colorimeter "ZE-2000" manufactured by NIPPON DENSHOKU INDUSTRIES Co., LTD, and then the resin sheets were put into a tester to perform a durability test under the following conditions.

UV irradiation intensity: 50 W/m$^2$
Humidity: 51%
Black panel temperature: 62° C.
Time: 100 hours
Irradiated surface: Surface on which hairlike bodies were formed After the test, the color difference of the films was measured again, and a ΔE value as an index of yellowing resistance before and after testing was calculated. If the ΔE value was 1.5 or less, it was determined to be good.

(11-1) Double-Sided Vacuum Molding

Resin sheets in which an acrylic pressure-sensitive adhesive film (MF50, G25: manufactured by Nichieikako Co., Ltd.) was laminated on the other surface to which hairlike bodies were added were prepared. Molded products were formed by heating the resin sheets in a vacuum atmosphere with a double-sided vacuum molding machine (NGF-0709-S type: manufactured by Fu-se Vacuum Forming Ltd.), and then vacuum/pressure molding the resin sheets to a surface of a prepared table member in an atmospheric pressure atmosphere. The sheet was heated in a surface temperature range of 80-220° C. for 40-300 seconds and stretched 1.6 times at a side surface portion of the table member.

(11-2) Vacuum Molding

The resin sheets were heated in a vacuum atmosphere with a vacuum molding machine (manufactured by Asano Laboratories Co., Ltd.), and then molded products were formed by vacuum molding with a mold fashioned into mold for a container for storing miscellaneous goods. The sheets were heated in a surface temperature range of 80-220° C. for 40-300 seconds and stretched 1.75 times at a side surface portion of the container-shaped molded product.

Examples 1, 2, 7, and 10-12

Single layer resin sheets with the compositions and thicknesses shown Table 1 and in which one surface has the surface shapes shown in Table 3 were obtained by using a single 65 mm single-screw extruder, extruding with a T-die method and, so as to add a hairlike body shape to a surface of these resin sheets, casting with a transfer roll on which a relief process had been performed with an electrocasting method and which was adjusted to 60-180° C. and a silicon-based rubber touch roll adjusted to 10-90° C.

The obtained resin sheets were irradiated with an electron beam using an electron beam irradiation apparatus (manufactured by IWASAKI ELECTRIC CO., LTD.) under irradiation conditions of an acceleration voltage of 200 kV and a dose of 250 kGy to perform a crosslinking treatment on the hairlike bodies and the underlayer. The resin sheets were repeatedly irradiated with the electron beam as necessary.

When elongation percentages at break of the resin sheets before and after the electron beam irradiation were measured, the elongation percentage at break before the electron beam irradiation was 500%, but the elongation percentage at break after the electron beam irradiation was 260%. Note that the elongation percentage at break was defined as a value obtained by manufacturing five JIS No. 2 dumbbells punched out in the extrusion direction of the resin sheets and arithmetically averaging elongation percentages of the dumbbells until the dumbbells were broken when tension was applied thereto at a tension rate of 10 mm/min under the conditions 23±1° C. and relative humidity 50±2%.

Example 3

A three-layer resin sheet in which one surface thereof has the surface shape shown in Table 3 and each layer has the composition and the thickness shown in Table 1 was obtained by using three 40 mm single-screw extruders and feed blocks, extruding with a T-die method and, so as to add a hairlike body shape to the surface of the resin sheet, casting with a transfer roll on which a relief process had been performed with an electrocasting method and a silicon-based rubber touch roll Examples 4 and 13-17

Three-layer resin sheets in which one surface thereof has the surface shape shown in Table 3 and each layer has the composition and the thickness shown in Table 1 were obtained similarly to Example 3, except for using a transfer roll with a different size relief shape.

Example 5

A resin sheet having the composition and the thickness shown in Table 1 and in which one surface thereof has the surface shape shown in Table 3 was obtained by fabricating a 300 mm square mold on which a relief process had been performed with an electrocasting method so as to add a hairlike body shape to a surface of the resin sheet and hot pressing an already-fabricated resin sheet by using an electro-thermal press.

Example 6

A two-layer resin sheet in which one surface thereof has the surface shape shown in Table 3 and each layer has the composition and the thickness shown in Table 1 was obtained by using two 40 mm single-screw extruders and feed blocks, extruding with a T-die method, and, so as to add a hairlike body shape to the surface of the resin sheet, casting with a transfer roll on which a relief process had been performed with an electrocasting method and a silicon-based rubber touch roll.

Example 8

A three-layer resin sheet in which one surface thereof has the surface shape shown in Table 3 and each layer has the composition and the thickness shown in Table 1 was obtained by obtaining a three-layer resin sheet with an extrusion laminate molding method and, so as to add a hairlike body shape to the surface of the resin sheet, casting with a transfer roll on which a relief process had been performed with an electrocasting method and a silicon-based rubber touch roll.

Example 9

A three-layer resin sheet in which one surface thereof has the surface shape shown in Table 3 and each layer has the composition and the thickness shown in Table 1 was obtained similarly to Example 8, except for using a transfer roll with a different size relief shape.

Comparative Example 1

A two-layer resin sheet with the composition and the thickness shown in Table 2 in which one surface has an embossed shape in which $R_z$ (ten point average roughness) is 55 μm was obtained similarly to Example 6, except for using, so as to add the embossed shape to the surface of the resin sheet, a transfer roll on which a relief process had been performed with a blast method Comparative Example 2

A three-layer resin sheet in which one surface thereof has the surface shape shown in Table 3 and each layer has the composition and the thickness shown in Table 2 was obtained similarly to Example 3, except for using, so as to add a bell-like convex shape to the surface of the resin sheet, a transfer roll on which a relief process had been performed with an etching method.

Comparative Example 3

A single-layer resin sheet with the composition and the thickness shown in Table 2 and in which one surface has the surface shape shown in Table 3 was obtained similarly to Example 1, except for using, so as to add a quadrangular pyramid-like concave shape, a transfer roll on which a relief process had been performed with an electrocasting method.

Comparative Example 4

A single-layer resin sheet with the composition and the thickness shown in Table 2 and in which both surfaces are smooth was obtained similarly to Example 1, except for using a roll on which a relief process had not been performed in place of the transfer roll.

Comparative Example 5

A three-layer resin sheet in which one surface thereof has the surface shape shown in Table 3 and each layer has the composition and the thickness shown in Table 2 was obtained similarly to Example 3, except for using, so as to add a hexagonal pyramid-like convex shape to the surface of the resin sheet, a transfer roll on which a relief process had been performed with an electrocasting method.

Comparative Example 6

Using a transfer roll similar to that of Example 2 and a three-layer sheet similar to that of Example 3, a resin sheet with the composition and the thickness shown in Table 2 and in which one surface has the surface shape shown in Table 3 was obtained. Further, an electron beam irradiation treatment was not performed.

Evaluative testing of the characteristics was performed using the resin sheets obtained in the examples and the comparative examples and molded products in which the resin sheets were vacuum molded and the results are shown in Table 3.

TABLE 1

| | | HAIRLIKE BODIES AND UNDERLAYER | | | | | | | | | |
|---|---|---|---|---|---|---|---|---|---|---|---|
| | | (A-1) RANDOM PP | (A-2) BLOCK PP | (B-1) PE | (B-2) PE | (C) STYRENIC THERMOPLASTIC ELASTOMER | (D) PVC | (E) PVDF | (F-1) TPU | (F-2) TPU | (G) COLORANT WHITE | (H) COLORANT RED |
| EXAMPLE 1 | COMPOSITION (mass %) | 100 | — | — | — | — | — | — | — | — | — | — |
| | THICKNESS (µm) | 390 (AVERAGE HEIGHT OF HAIRLIKE BODIES + AVERAGE THICKNESS OF UNDERLAYER) | | | | | | | | | | |
| EXAMPLE 2 | COMPOSITION (mass %) | — | 100 | — | — | — | — | — | — | — | — | — |
| | THICKNESS (µm) | 450 (AVERAGE HEIGHT OF HAIRLIKE BODIES + AVERAGE THICKNESS OF UNDERLAYER) | | | | | | | | | | |
| EXAMPLE 3 | COMPOSITION (mass %) | — | — | 76 | — | 20 | — | — | — | — | 2 | — |
| | THICKNESS (µm) | 520 (AVERAGE HEIGHT OF HAIRLIKE BODIES + AVERAGE THICKNESS OF UNDERLAYER) | | | | | | | | | | |
| EXAMPLE 4 | COMPOSITION (mass %) | — | — | — | 76 | 20 | — | — | — | — | 2 | 2 |
| | THICKNESS (µm) | 640 (AVERAGE HEIGHT OF HAIRLIKE BODIES + AVERAGE THICKNESS OF UNDERLAYER) | | | | | | | | | | |
| EXAMPLE 5 | COMPOSITION (mass %) | — | — | — | — | — | 100 | — | — | — | — | — |
| | THICKNESS (µm) | 550 (AVERAGE HEIGHT OF HAIRLIKE BODIES + AVERAGE THICKNESS OF UNDERLAYER) | | | | | | | | | | |
| EXAMPLE 6 | COMPOSITION (mass %) | — | — | — | — | — | — | 96 | — | — | 2 | — |
| | THICKNESS (µm) | 700 (AVERAGE HEIGHT OF HAIRLIKE BODIES + AVERAGE THICKNESS OF UNDERLAYER) | | | | | | | | | | |
| EXAMPLE 7 | COMPOSITION (mass %) | — | — | — | — | — | — | 100 | — | — | — | — |
| | THICKNESS (µm) | 700 (AVERAGE HEIGHT OF HAIRLIKE BODIES + AVERAGE THICKNESS OF UNDERLAYER) | | | | | | | | | | |
| EXAMPLE 8 | COMPOSITION (mass %) | — | 80 | — | — | 16 | — | — | — | — | 2 | 2 |
| | THICKNESS (µm) | 530 (AVERAGE HEIGHT OF HAIRLIKE BODIES + AVERAGE THICKNESS OF UNDERLAYER) | | | | | | | | | | |
| EXAMPLE 9 | COMPOSITION (mass%) | — | — | 80 | — | — | — | — | — | — | — | — |
| | THICKNESS (µm) | 810 (AVERAGE HEIGHT OF HAIRLIKE BODIES + AVERAGE THICKNESS OF UNDERLAYER) | | | | | | | | | | |

TABLE 1-continued

| | | HAIRLIKE BODIES AND UNDERLAYER | | | | | | |
|---|---|---|---|---|---|---|---|---|
| | | (I) COLORANT YELLOW | (J) COLORANT PEARL | (K) COLORANT SILVER | (L-1) COLORANT BLACK | (L-2) COLORANT WHITE | (L-3) WEATHER RESISTANCE MASTER | (L-4) WEATHER RESISTANCE MASTER |
| EXAMPLE 1 | COMPOSITION (mass %) | — | — | — | — | — | — | — |
| | THICKNESS (μm) | 390 (AVERAGE HEIGHT OF HAIRLIKE BODIES + AVERAGE THICKNESS OF UNDERLAYER) | | | | | | |
| EXAMPLE 2 | COMPOSITION (mass %) | — | — | — | — | — | — | — |
| | THICKNESS (μm) | 450 (AVERAGE HEIGHT OF HAIRLIKE BODIES + AVERAGE THICKNESS OF UNDERLAYER) | | | | | | |
| EXAMPLE 3 | COMPOSITION (mass %) | 2 | — | — | — | — | — | — |
| | THICKNESS (μm) | 520 (AVERAGE HEIGHT OF HAIRLIKE BODIES + AVERAGE THICKNESS OF UNDERLAYER) | | | | | | |
| EXAMPLE 4 | COMPOSITION (mass %) | — | — | — | — | — | — | — |
| | THICKNESS (μm) | 640 (AVERAGE HEIGHT OF HAIRLIKE BODIES + AVERAGE THICKNESS OF UNDERLAYER) | | | | | | |
| EXAMPLE 5 | COMPOSITION (mass %) | — | — | — | — | — | — | — |
| | THICKNESS (μm) | 550 (AVERAGE HEIGHT OF HAIRLIKE BODIES + AVERAGE THICKNESS OF UNDERLAYER) | | | | | | |
| EXAMPLE 6 | COMPOSITION (mass %) | 2 | — | — | — | — | — | — |
| | THICKNESS (μm) | 700 (AVERAGE HEIGHT OF HAIRLIKE BODIES + AVERAGE THICKNESS OF UNDERLAYER) | | | | | | |
| EXAMPLE 7 | COMPOSITION (mass %) | — | — | — | — | — | — | — |
| | THICKNESS (μm) | 700 (AVERAGE HEIGHT OF HAIRLIKE BODIES + AVERAGE THICKNESS OF UNDERLAYER) | | | | | | |
| EXAMPLE 8 | COMPOSITION (mass %) | — | — | — | — | — | — | — |
| | THICKNESS (μm) | 530 (AVERAGE HEIGHT OF HAIRLIKE BODIES + AVERAGE THICKNESS OF UNDERLAYER) | | | | | | |
| EXAMPLE 9 | COMPOSITION (mass%) | — | — | 20 | — | — | — | — |
| | THICKNESS (μm) | 810 (AVERAGE HEIGHT OF HAIRLIKE BODIES + AVERAGE THICKNESS OF UNDERLAYER) | | | | | | |

| | | | | | SEALANT | | |
|---|---|---|---|---|---|---|---|
| (M) WATER REPELLANT | (N) ANTISTATIC AGENT | (O) ANTIBACTERIAL AGENT | (P) MOLD RELEASE AGENT | (Q) UV ABSORBING AGENT | (R-1) HYDROGENATED STYRENIC THERMOPLASTIC ELASTOMER | (S-1) MODIFIED OLEFINIC POLYMER RESIN | (S-2) MODIFIED OLEFINIC POLYMER RESIN |
| — | — | — | — | — | — | — | — |
| — | — | — | — | — | — | — | — |
| — | — | — | — | — | 100 | — | — |
| — | — | — | — | — | — | 30 | — |
| — | — | — | — | — | — | 100 | — |
| — | — | — | — | — | — | 30 | — |
| — | — | — | — | — | — | — | — |

TABLE 1-continued

| | | | | | | | | |
|---|---|---|---|---|---|---|---|---|
| — | — | — | — | — | — | — | — | — |
| — | — | — | — | — | — | — | — | — |
| — | — | — | — | — | — | — | 20 | 100 |
| — | — | — | — | — | — | — | 20 | 100 |

| | SEALANT | SUBSTRATE LAYER | | | | | | | | |
|---|---|---|---|---|---|---|---|---|---|---|
| | (R-2) HYDROGENATED STYRENIC THERMOPLASTIC ELASTOMER | (T) SBC | (U) CPPS | (V) PET FILM | (W) NYLON 6 FILM | (X) PMMA | (Y) ABS | (Q) ULTRAVIOLET ABSORBING AGENT | (A-1) RANDOM PP | (R-2) HYDROGENATED STYRENIC THERMOPLASTIC ELASTOMER |
| | — | — | — | — | — | — | — | — | — | — |
| | — | — | — | — | — | — | — | — | — | — |
| | — | 50 | 50 | — | — | — | — | — | — | — |
| | 30 | — | — | — | — | — | — | 150 | — | — |
| | — | — | — | — | — | — | 100 | — | — | — |
| | 30 | — | — | — | — | — | — | 150 | — | — |
| | — | — | — | — | — | — | — | — | — | — |
| | — | — | — | — | 100 | — | — | — | — | — |
| | — | — | — | — | — | — | — | 100 | — | — |
| | — | — | — | — | — | — | — | — | — | — |
| | — | — | — | 100 | — | — | — | — | — | — |
| | 20 | — | — | — | — | — | — | 16 | — | — |
| | — | — | — | — | 100 | — | — | — | — | — |
| | 20 | — | — | — | — | — | — | 23 | — | — |

| EXAMPLE 10 | COMPOSITION (mass %) | — | — | 80 | — | — | — | — | 10 | — | — | — |
| --- | --- | --- | --- | --- | --- | --- | --- | --- | --- | --- | --- | --- |
| | THICKNESS (μm) | 800 (AVERAGE HEIGHT OF HAIRLIKE BODIES + AVERAGE THICKNESS OF UNDERLAYER) | | | | | | | | | | |
| EXAMPLE 11 | COMPOSITION (mass %) | — | — | 81 | — | — | — | 2 | — | 2 | — | — |
| | THICKNESS (μm) | 900 (AVERAGE HEIGHT OF HAIRLIKE BODIES + AVERAGE THICKNESS OF UNDERLAYER) | | | | | | | | | | |
| EXAMPLE 12 | COMPOSITION (mass %) | — | — | 80 | — | — | — | — | 10 | — | — | — |
| | THICKNESS (μm) | 850 (AVERAGE HEIGHT OF HAIRLIKE BODIES + AVERAGE THICKNESS OF UNDERLAYER) | | | | | | | | | | |
| EXAMPLE 13 | COMPOSITION (mass %) | — | — | — | — | — | 96 | — | — | — | — | 4 |
| | THICKNESS (μm) | 400 (AVERAGE HEIGHT OF HAIRLIKE BODIES + AVERAGE THICKNESS OF UNDERLAYER) | | | | | | | | | | |
| EXAMPLE 14 | COMPOSITION (mass %) | — | — | — | — | — | 96 | — | — | — | 4 | — |
| | THICKNESS (μm) | 400 (AVERAGE HEIGHT OF HAIRLIKE BODIES + AVERAGE THICKNESS OF UNDERLAYER) | | | | | | | | | | |
| EXAMPLE 15 | COMPOSITION (mass %) | — | — | — | — | — | 90 | — | — | — | 3 | — |
| | THICKNESS (μm) | 400 (AVERAGE HEIGHT OF HAIRLIKE BODIES + AVERAGE THICKNESS OF UNDERLAYER) | | | | | | | | | | |
| EXAMPLE 16 | COMPOSITION (mass %) | — | — | — | — | — | 94 | — | — | — | 3 | — |
| | THICKNESS (μm) | 400 (AVERAGE HEIGHT OF HAIRLIKE BODIES + AVERAGE THICKNESS OF UNDERLAYER) | | | | | | | | | | |
| EXAMPLE 17 | COMPOSITION (mass %) | — | — | — | — | — | 91 | — | — | — | — | — |
| | THICKNESS (μm) | 400 (AVERAGE HEIGHT OF HAIRLIKE BODIES + AVERAGE THICKNESS OF UNDERLAYER) | | | | | | | | | | |

| | | | | | | | | | | |
|---|---|---|---|---|---|---|---|---|---|---|
| 10 | — | — | — | — | — | — | — | — | — | — |
| — | 13 | — | — | — | — | — | — | — | — | — |
| — | — | 1 | — | — | — | — | — | — | — | — |
| — | — | — | 70 | — | 30 | 50 | 45 | — | — | 5 |
| | | | | 30 | | | | | 170 | |
| — | — | — | 70 | — | 30 | 50 | 45 | — | — | 5 |
| | | | | 30 | | | | | 170 | |

TABLE 1-continued

| | | | | | | | | | | | | | | | | | |
|---|---|---|---|---|---|---|---|---|---|---|---|---|---|---|---|---|---|
| — | — | — | 3 | 4 | 70 | — | — | 30 | — | — | — | — | — | 96 | 4 | — | — |
| | | | | | 30 | | | | | | | | | 250 | | | |
| — | — | — | 3 | — | 70 | — | — | 30 | — | — | — | — | — | 95 | — | — | 5 |
| | | | | | 30 | | | | | | | | | 170 | | | |
| — | 1 | 1 | 3 | 4 | 70 | — | — | 30 | — | — | — | — | — | — | 4 | 96 | — |
| | | | | | — | | | | | | | | | 170 | | | |

TABLE 2

| | | HAIRLIKE BODIES AND UNDERLAYER | | | | | | | | | |
|---|---|---|---|---|---|---|---|---|---|---|---|
| | | (A-1) RANDOM PP | (A-2) BLOCK PP | (B-1) PE | (B-2) PE | (C) STYRENIC THERMOPLASTIC ELASTOMER | (D) PVC | (E) PVDF | (F-1) TPU | (F-2) TPU | (G) COLORANT WHITE |
| COMPARATIVE EXAMPLE 1 | COMPOSITION (mass %) | — | — | — | — | — | — | 100 | — | — | — |
| | THICKNESS (μm) | 400 (AVERAGE THICKNESS OF SHEET) | | | | | | | | | |
| COMPARATIVE EXAMPLE 2 | COMPOSITION (mass %) | 50 | — | 50 | — | — | — | — | — | — | — |
| | THICKNESS (μm) | 388 (AVERAGE HEIGHT OF CONVEX SHAPE + AVERAGE THICKNESS OF UNDERLAYER) | | | | | | | | | |
| COMPARATIVE EXAMPLE 3 | COMPOSITION (mass %) | 100 | — | — | — | — | — | — | — | — | — |
| | THICKNESS (μm) | 250 (AVERAGE THICKNESS OF SHEET) | | | | | | | | | |
| COMPARATIVE EXAMPLE 4 | COMPOSITION (mass %) | — | — | — | — | — | 100 | — | — | — | — |
| | THICKNESS (μm) | 300 (AVERAGE THICKNESS OF SHEET) | | | | | | | | | |
| COMPARATIVE EXAMPLE 5 | COMPOSITION (mass %) | — | 100 | — | — | — | — | — | — | — | — |
| | THICKNESS (μm) | 488 (AVERAGE HEIGHT OF CONVEX SHAPE + AVERAGE THICKNESS OF UNDERLAYER) | | | | | | | | | |
| COMPARATIVE EXAMPLE 6 | COMPOSITION (mass %) | — | — | 100 | — | — | — | — | — | — | — |
| | THICKNESS (μm) | 480 (AVERAGE HEIGHT OF CONVEX SHAPE + AVERAGE THICKNESS OF UNDERLAYER) | | | | | | | | | |

| | | HAIRLIKE BODIES AND UNDERLAYER | | | | | |
|---|---|---|---|---|---|---|---|
| | | (H) COLORANT RED | (I) COLORANT YELLOW | (J) COLORANT PEARL | (K) COLORANT SILVER | (L-1) COLORANT BLACK | (L-2) COLORANT WHITE |
| COMPARATIVE EXAMPLE 1 | COMPOSITION (mass %) | — | — | — | — | — | — |
| | THICKNESS (μm) | 400 (AVERAGE THICKNESS OF SHEET) | | | | | |
| COMPARATIVE EXAMPLE 2 | COMPOSITION (mass %) | — | — | — | — | — | — |
| | THICKNESS (μm) | 388 (AVERAGE HEIGHT OF CONVEX SHAPE + AVERAGE THICKNESS OF UNDERLAYER) | | | | | |
| COMPARATIVE EXAMPLE 3 | COMPOSITION (mass %) | — | — | — | — | — | — |
| | THICKNESS (μm) | 250 (AVERAGE THICKNESS OF SHEET) | | | | | |
| COMPARATIVE EXAMPLE 4 | COMPOSITION (mass %) | — | — | — | — | — | — |
| | THICKNESS (μm) | 300 (AVERAGE THICKNESS OF SHEET) | | | | | |
| COMPARATIVE EXAMPLE 5 | COMPOSITION (mass %) | — | — | — | — | — | — |
| | THICKNESS (μm) | 488 (AVERAGE HEIGHT OF CONVEX SHAPE + AVERAGE THICKNESS OF UNDERLAYER) | | | | | |
| COMPARATIVE EXAMPLE 6 | COMPOSITION (mass %) | — | — | — | — | — | — |
| | THICKNESS (μm) | 480 (AVERAGE HEIGHT OF CONVEX SHAPE + AVERAGE THICKNESS OF UNDERLAYER) | | | | | |

TABLE 2-continued

| | | | | | | | SEALANT LAYER | | | |
|---|---|---|---|---|---|---|---|---|---|---|
| (L-3) WEATHER RESISTANCE MASTER | (L-4) WEATHER RESISTANCE MASTER | (M) WATER REPELLANT | (N) ANTISTATIC AGENT | (O) ANTIBACTERIAL AGENT | (P) MOLD RELEASE AGENT | (Q) UV ABSORBING AGENT | (R-1) HYDROGENATED STYRENIC THERMOPLASTIC ELASTOMER | (S-1) MODIFIED OLEFINIC POLYMER RESIN | (S-2) MODIFIED OLEFINIC POLYMER RESIN | (R-2) HYDROGENATED STYRENIC THERMOPLASTIC ELASTOMER |
| — | — | — | — | — | — | — | — | — | — | — |
| — | — | — | — | — | — | — | 100 | 20 | — | — |
| — | — | — | — | — | — | — | — | — | — | — |
| — | — | — | — | — | — | — | — | — | — | — |
| — | — | — | — | — | — | — | — | — | 100 20 | — |
| — | — | — | — | — | — | — | — | 20 | 100 | — |

| | | | SUBSTRATE LAYER | | | | | |
|---|---|---|---|---|---|---|---|---|
| (T) SBC | (U) GPPS | (V) PET FILM | (W) NYLON 6 FILM | (X) PMMA | (Y) ABS | (Q) UV ABSORBING AGENT | (A-1) RANDOM PP | (R-2) HYDROGENATED STYRENIC THERMOPLASTIC ELASTOMER |
| — | — | — | — | 100 | 200 | — | — | — |
| 50 | 50 | — | — | — | 200 | — | — | — |
| — | — | — | — | — | — | — | — | — |
| — | — | — | — | — | — | — | — | — |
| 50 | 50 | — | — | — | 200 | — | — | — |
| 50 | 50 | — | — | — | 200 | — | — | — |

TABLE 3

| | RESIN SHEET EVALUATION | | | | | |
|---|---|---|---|---|---|---|
| | SURFACE SHAPE | | | | | |
| | AVERAGE HEIGHT OF HAIRLIKE BODIES (μm) | AVERAGE DIAMETER OF HAIRLIKE BODIES (μm) | AVERAGE SPACING OF HAIRLIKE BODIES (μm) | AVERAGE THICKNESS OF UNDERLAYER (μm) | ARRANGEMENT OF HAIRLIKE BODIES | GOOD TACTILE SENSATION "COMFORTABLENESS" WHEN CONTACTED |
| EXAMPLE 1 | 250 | 22 | 30 | 140 | STAGGERED ARRANGEMENT | ◯ |
| EXAMPLE 2 | 300 | 20 | 30 | 180 | STAGGERED ARRANGEMENT | ◯ |
| EXAMPLE 3 | 450 | 10 | 60 | 170 | STAGGERED ARRANGEMENT | ◯ |
| EXAMPLE 4 | 460 | 10 | 60 | 180 | STAGGERED ARRANGEMENT | ◯ |
| EXAMPLE 5 | 150 | 20 | 30 | 400 | STAGGERED ARRANGEMENT | ◯ |
| EXAMPLE 6 | 400 | 11 | 100 | 300 | STAGGERED ARRANGEMENT | ◯ |
| EXAMPLE 7 | 420 | 10 | 100 | 280 | STAGGERED ARRANGEMENT | ◯ |
| EXAMPLE 8 | 330 | 19 | 60 | 200 | STAGGERED ARRANGEMENT | ◯ |
| EXAMPLE 9 | 510 | 8 | 100 | 300 | STAGGERED ARRANGEMENT | ◯ |

TABLE 3-continued

| | | | | | | |
|---|---|---|---|---|---|---|
| EXAMPLE 10 | 500 | 8 | 60 | 300 | STAGGERED ARRANGEMENT | ○ |
| EXAMPLE 11 | 650 | 6 | 60 | 250 | STAGGERED ARRANGEMENT | ○ |

| | RESIN SHEET EVALUATION | | | | | |
|---|---|---|---|---|---|---|
| | GOOD TACTILE SENSATION FEELING OF TEXTURE WHEN "COMFORTABLENESS" IS FELT | ELECTRON BEAM IRRADIATION CONDITIONS | | DIFFUSIVTY (°) | RESIN HARDNESS (A) | HEAT TRANSFER SPEED ($q$-max) (J/cm$^2$ · sec) |
| | | ACCELERATION VOLTAGE (KV) | DOSE (kGy) | | | |
| EXAMPLE 1 | SOFT | 200 | 250 | −79~87 | 93 | 0.274 |
| EXAMPLE 2 | SOFT | 220 | 200 | −80~87 | 93 | 0.270 |
| EXAMPLE 3 | FLUFFY | 210 | 250 | −79~87 | 92 | 0.265 |
| EXAMPLE 4 | FLUFFY | 150 | 150 | −87~86 | 91 | 0.265 |
| EXAMPLE 5 | SOFT | 220 | 300 | −79~81 | 91 | 0.270 |
| EXAMPLE 6 | SOFT | 200 | 250 | −85~86 | 94 | 0.265 |
| EXAMPLE 7 | SOFT | 200 | 250 | −85~86 | 93 | 0.255 |
| EXAMPLE 8 | SOFT | 210 | 250 | −83~85 | 91 | 0.272 |
| EXAMPLE 9 | FLUFFY | 130 | 150 | −85~86 | 92 | 0.251 |
| EXAMPLE 10 | FLUFFY | 200 | 210 | −86~86 | 91 | 0.252 |
| EXAMPLE 11 | FLUFFY | 180 | 200 | −87~86 | 91 | 0.250 |

| RATIO OF STATIC FRICTION COEFFICIENT WITH RESPECT TO DYNAMIC FRICTION COEFFICIENT | CONTACT ANGLE (°) PURIFIED WATER | WEATHER RESISTANCE (ΔE) | SURFACE RESISTIVITY (Ω/□) | ANTIBACTERIAL E. COLI | ANTIBACTERIAL STAPHYLOCOCCUS AIREIS | EVALUATION FOR MOLDED PRODUCT TABLE MEMBER (SIDE SURFACE PORTION) MOLDABILITY (DRAW RATIO: 1.6) |
|---|---|---|---|---|---|---|
| 2.0 | 123 | — | — | — | — | GOOD |
| 2.3 | 124 | — | — | — | — | GOOD |
| 2.5 | 125 | — | — | — | — | GOOD |
| 2.5 | 124 | — | — | — | — | GOOD |
| 2.1 | 124 | — | — | — | — | GOOD |
| 2.4 | 120 | — | — | — | — | GOOD |
| 2.4 | 125 | — | — | — | — | GOOD |
| 2.3 | 125 | — | — | — | — | GOOD |
| 2.8 | 125 | — | — | — | — | GOOD |
| 2.8 | 135 | — | — | — | — | GOOD |
| 3.5 | 124 | — | $2.3 \times 10^{13}$ | — | — | GOOD |

| EVALUATION FOR MOLDED PRODUCT | | | | | | |
|---|---|---|---|---|---|---|
| TABLE MEMBER (SIDE SURFACE PORTION) | | | CONTAINER FOR LIVINGWARE (SIDE SURFACE PORTION) | | | |
| AVERAGE HEIGHT OF HAIRLIKE BODIES (μm) | REDUCTION RATE OF AVERAGE HEIGHT OF HAIRLIKE BODIES (%) | TEXTURE | MOLDABILITY (DRAW RATIO: 1.75) | AVERAGE HEIGHT OF HAIRLIKE BODIES (μm) | REDUCTION RATE OF AVERAGE HEIGHT OF HAIRLIKE BODIES (%) | TEXTURE |
| 225 | 10 | SOFT | GOOD | 213 | 15 | SOFT |
| 276 | 8 | SOFT | GOOD | 258 | 14 | SOFT |
| 410 | 9 | FLUFFY | GOOD | 396 | 12 | FLUFFY |
| 428 | 7 | FLUFFY | GOOD | 391 | 15 | FLUFFY |
| 132 | 12 | SOFT | GOOD | 120 | 20 | SOFT |

TABLE 3-continued

|  |  |  | 360 | 10 | SOFT | GOOD | 340 | 15 | SOFT |
|  |  |  | 378 | 10 | SOFT | GOOD | 357 | 15 | SOFT |
|  |  |  | 310 | 6 | SOFT | GOOD | 281 | 15 | SOFT |
|  |  |  | 464 | 9 | FLUFFY | GOOD | 423 | 17 | FLUFFY |
|  |  |  | 465 | 7 | FLUFFY | GOOD | 425 | 15 | FLUFFY |
|  |  |  | 585 | 10 | FLUFFY | GOOD | 559 | 14 | FLUFFY |
| EXAMPLE 12 | 550 | 7 | 60 | 300 | STAGGERED ARRANGEMENT | ○ | FLUFFY | 200 | 210 | −86~87 | 91 | 0.251 |
| EXAMPLE 13 | 290 | 22 | 60 | 110 | STAGGERED ARRANGEMENT | ○ | MOIST | 200 | 210 | −79~79 | 80 | 0.133 |
| EXAMPLE 14 | 250 | 20 | 30 | 150 | STAGGERED ARRANGEMENT | ○ | MOIST | 210 | 250 | −78~80 | 80 | 0.166 |
| EXAMPLE 15 | 290 | 22 | 60 | 110 | STAGGERED ARRANGEMENT | ○ | MOIST | 210 | 250 | −77~80 | 80 | 0.134 |
| EXAMPLE 16 | 250 | 20 | 30 | 150 | STAGGERED ARRANGEMENT | ○ | MOIST | 210 | 250 | −77~81 | 80 | 0.165 |
| EXAMPLE 17 | 220 | 23 | 60 | 180 | STAGGERED ARRANGEMENT | ○ | MOIST | 210 | 250 | −77~81 | 80 | 0.300 |
| COMPARATIVE EXAMPLE 1 | EMBOSSED SHAPE 55 (Rz) | — | — | 400 | RANDOM | x | ROUGH | 200 | 250 | −75~78 | 93 | 0.475 |
| COMPARATIVE EXAMPLE 2 | CONVEX BELL-LIKE SHAPE 88 (CONVEX HEIGHT) | 100 (CONVEX BOTTOM SURFACE DIAMETER) | 100 | 300 | STAGGERED ARRANGEMENT | x | SMOOTH | 200 | 250 | −60~65 | 93 | 0.381 |
| COMPARATIVE EXAMPLE 3 | CONCAVE QUADRANGULAR PYRAMID SHAPE | 50 (LENGTH OF ONE SIDE OF CONCAVE BOTTOM) | PITCH: 50 | 250 | GRID ARRANGEMENT | x | GLOSSY | 210 | 250 | −77~75 | 92 | 0.421 |
| COMPARATIVE EXAMPLE 4 | SMOOTH SHAPE | — | — | 300 | — | x | GLOSSY | — | — | 45 | 91 | 0.485 |
| COMPARATIVE EXAMPLE 5 | CONVEX HEXAGONAL PYRAMID SHAPE 88 (CONVEX HEIGHT) | 90 (CONVEX BOTTOM SURFACE DIAMETER) | 90 | 400 | STAGGERED ARRANGEMENT | x | ROUGH | — | — | −75~78 | 94 | 0.394 |
| COMPARATIVE EXAMPLE 6 | 300 | 20 | 30 | 180 | STAGGERED ARRANGEMENT | ○ | SOFT | — | — | −80~87 | 93 | 0.27 |
| 3.2 | 125 | — | — | <10 | <10 | GOOD | 495 | 10 | FLUFFY | GOOD | 468 | 15 | FLUFFY |
| 1.3 | 85 | — | — | — | — | GOOD | 261 | 10 | MOIST | GOOD | 252 | 13 | MOIST |
| 1.2 | 86 | — | — | — | — | GOOD | 230 | 8 | MOIST | GOOD | 213 | 15 | MOIST |
| 1.3 | 85 | 0.5 | — | — | — | GOOD | 261 | 10 | MOIST | GOOD | 249 | 14 | MOIST |
| 1.2 | 84 | — | — | — | — | GOOD | 223 | 11 | MOIST | GOOD | 210 | 16 | MOIST |
| 1.1 | 88 | 0.5 | — | — | — | GOOD | 198 | 10 | MOIST | GOOD | 187 | 15 | MOIST |
| 1.4 | 124 | — | — | — | — | GOOD | — | — | ROUGH | GOOD | — | — | ROUGH |
| 1.3 | 119 | — | — | — | — | GOOD | 79 (CONVEX HEIGHT) | 10 | SMOOTH | GOOD | 69 (CONVEX HEIGHT) | 22 | SMOOTH |
| 1.1 | 120 | — | — | — | — | GOOD | 36 (CONCAVE DEPTH) | 20 | GLOSSY | GOOD | 33 (CONCAVE DEPTH) | 27 | GLOSSY |
| 1.3 | 85 | — | — | — | — | GOOD | — | — | GLOSSY | GOOD | — | — | GLOSSY |
| 1.3 | 131 | — | — | — | — | GOOD | SHAPE VANISHED | — | GLOSSY (SHAPE DISAPPEARED) | GOOD | SHAPE DISAPPEARED | — | GLOSSY (SHAPE DISAPPEARED) |
| 2.3 | 125 | — | — | — | — | GOOD | SHAPE VANISHED | — | GLOSSY (SHAPE DISAPPEARED) | GOOD | SHAPE DISAPPEARED | — | GLOSSY (SHAPE DISAPPEARED) |

The following is clear from the results shown in Table 3.

In all of the resin sheets of Examples 1-17 and the vacuum-molded molded products, results satisfying the evaluation criteria pertaining to good tactile sensation were obtained. In addition, satisfactory results were also obtained with respect to diffusivity, static friction coefficient with respect to dynamic friction coefficient, heat transfer speed, and contact angle. Further, results showing antistatic performance in Example 11, antibacterial performance in Example 12, and weather resistance in Examples 15 and 17 were obtained. With regard to this, results satisfying the evaluation criteria pertaining to good tactile sensation were not obtained by the resin sheets of Comparative Examples 1-6 and the molded products obtained by vacuum molding.

Further, the shapes of the resin sheets obtained in Examples 1-17 were observed under the following conditions with a field emission-type scanning electron microscope (FE-SEM, JEOL, Ltd. JSM-7001F).

It was observed from the scanning electron microscope images that the hairlike bodies do not tangle with one another and extend in a fixed direction. Further, the hairlike bodies had a configuration extending hairlike in a direction away from the underlayer and in which swellings are formed at the tips thereof. That is, the shape of the hairlike bodies was a shape in which the cross-sectional area gradually shrinks as the hairlike bodies deviate from the underlayer and then once again increases when the shape terminates. Further, it was observed that the shape of the tip part of the hairlike bodies was bud-shaped or mushroom-shaped and the bud-shaped or mushroom-shaped parts were partially hollow. Furthermore, a shape in which the hairlike bodies were inclined with respect to the underlayer and a shape having a portion in which the hairlike bodies were wound as shown in FIG. 3 were also observed. It is surmised that a better tactile sensation was expressed by having such a shape.

The present invention was explained above using various embodiments, but it need not be mentioned that the technical scope of the present invention is not limited to the scope described in the above embodiments. It is clear to a person skilled in the art that it is possible to add various modifications or improvements to the above embodiments. Further, it is clear from the recitations of the patent claims that aspects in which such modifications or improvements are added are included in the technical scope of the present invention.

REFERENCE SIGNS LIST

1 . . . Hairlike bodies and underlayer
1a . . . Underlayer
1b . . . Hairlike bodies
d . . . Diameter of the hairlike bodies
h . . . Height of the hairlike bodies
t . . . Spacing of the hairlike bodies
2 . . . Sealant resin layer
3 . . . Substrate layer

The invention claimed is:

1. A resin sheet having capillaceous bodies arranged regularly on at least one surface of an underlayer, wherein a continuous phase is formed without a structural boundary between the underlayer and the capillaceous bodies and the underlayer and the capillaceous bodies at least partially have a crosslinked structure,
wherein the average height of the capillaceous bodies is no less than 100 μm and no greater than 1,200 μm, the average diameter of the capillaceous bodies is no less than 1 μm and no greater than 50 μm, the average spacing of the capillaceous bodies is no less than 20 μm and no greater than 100 μm, and the average thickness of the underlayer is no less than 150 μm and no greater than 800 μm.

2. The resin sheet according to claim 1, wherein the underlayer and the capillaceous bodies have a thermoplastic resin as a main component and the thermoplastic resin comprises at least one selected from a styrenic resin, an olefinic resin, a polyvinyl chloride resin, a thermoplastic elastomer, and a fluorine-based resin.

3. The resin sheet according to claim 1, wherein the ratio of the static friction coefficient of the surface having the capillaceous bodies with respect to the dynamic friction coefficient thereof is 1.0-10.0.

4. The resin sheet according to claim 1, wherein the angular width at which the reflected light intensity of the surface having the capillaceous bodies is obtained is −90° to 90°.

5. The resin sheet according to claim 1, wherein the capillaceous bodies extend in a direction away from the underlayer and a swelling is formed at the tips thereof.

6. The resin sheet according to claim 1, wherein the underlayer and the capillaceous bodies are formed from a single sheet.

7. The resin sheet according to claim 1, wherein the resin sheet is a multilayer resin sheet.

8. The resin sheet according to claim 1, wherein at least one substrate layer selected from a styrenic resin, an olefinic resin, a polyester-based resin, a nylon-based resin, an acrylic resin, and a thermoplastic elastomer is laminated on the other surface of the underlayer.

9. The resin sheet according to claim 1, comprising one or more additives selected from a water and oil repellent, an antistatic agent, an antibacterial agent, an ultraviolet absorbing agent, a colorant, and a mold release agent.

10. The resin sheet according to claim 1, wherein the reduction rate of the average height of the capillaceous bodies due to heat-stretch molding is less than 30%.

11. The resin sheet according to claim 1, wherein the average spacing of the capillaceous bodies is no less than 40 μm and no greater than 60 μm.

12. An article using the resin sheet according to claim 1.

13. The article according to claim 12, wherein the article is an automobile interior member, an electronic device member, an electronic device cladding, a cosmetic container member, a stationery member, or a livingware member.

14. A molded product of the resin sheet according to claim 1.

15. The molded product according to claim 14, wherein the molded product is an automobile interior member, an electronic device member, an electronic device cladding, a cosmetic container member, a stationery member, or a livingware member.

16. A method for manufacturing the molded product according to claim 14, comprising vacuum-pressure molding, insert molding, or in-mold molding the resin sheet having capillaceous bodies arranged regularly on at least one surface of the underlayer, wherein a continuous phase is formed without a structural boundary between the underlayer and the capillaceous bodies and the underlayer and the capillaceous bodies at least partially have a crosslinked structure.

17. A method for manufacturing the resin sheet according to claim 1, wherein the capillaceous bodies are formed by casting with a transfer roll on which relief process has been performed and a touch roll, a sheet that has been melt-extruded from a die with an extrusion molding method.

* * * * *